US007594163B2

(12) United States Patent  (10) Patent No.: US 7,594,163 B2
Slack-Smith  (45) Date of Patent: Sep. 22, 2009

(54) UPDATING COPIES OF A DOCUMENT RECEIVED BY SECOND AND THIRD COLLABORATORS UPON RECEIVING ACKNOWLEDGE RECEIPTS FOR PATCHES TRANSMITTED BY SAID SECOND AND THIRD COLLABORATORS TO A FIRST COLLABORATOR

(75) Inventor: David Geoffrey Slack-Smith, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/901,149

(22) Filed: Jul. 29, 2004

(65) Prior Publication Data

US 2005/0039116 A1  Feb. 17, 2005

(30) Foreign Application Priority Data

Jul. 31, 2003  (AU)  ............................. 2003903994

(51) Int. Cl.
*G06F 3/048* (2006.01)
(52) U.S. Cl. .................. 715/200; 715/751; 715/753
(58) Field of Classification Search ............... 715/500, 715/511–513, 234, 277, 200, 203, 751–754, 715/759; 709/201, 204–205
See application file for complete search history.

(56) References Cited

U.S. PATENT DOCUMENTS

| 5,220,657 | A  | * | 6/1993  | Bly et al. ..................... 711/152 |
| 5,758,079 | A  | * | 5/1998  | Ludwig et al. .............. 709/204 |
| 5,987,242 | A  |   | 11/1999 | Bentley et al. ................ 703/13 |
| 6,199,082 | B1 |   | 3/2001  | Ferrel et al. ................. 715/522 |
| 6,230,171 | B1 | * | 5/2001  | Pacifici et al. ............... 715/201 |
| 7,152,220 | B2 | * | 12/2006 | Rickards et al. ............. 717/101 |

OTHER PUBLICATIONS

"Getting Results with Microsoft Office 97", Microsoft, 1997, pp. 396-411.*

* cited by examiner

*Primary Examiner*—Cesar B Paula
(74) *Attorney, Agent, or Firm*—Fitzpatrick, Cella, Harper & Scinto

(57) ABSTRACT

A method (100), apparatus (200) and computer program product for editing an electronic document is disclosed. Editorial modifications that a first collaborator has made to the document are published. Receipt of the modifications is acknowledged by one or more other collaborators and the published modifications are merged with any local modifications to produce a merged version of said modifications. The merged modifications are applied to the document to produce an edited version of the document including the editorial modifications. The edited version containing data incorporated therein indicating acknowledgment of the editorial modifications by one or more of the collaborators.

22 Claims, 16 Drawing Sheets

UPDATING COPIES OF A DOCUMENT RECEIVED BY SECOND AND THIRD COLLABORATORS UPON RECEIVING ACKNOWLEDGE RECEIPTS FOR PATCHES TRANSMITTED BY SAID SECOND AND THIRD COLLABORATORS TO A FIRST COLLABORATOR

CROSS-REFERENCE TO RELATED PATENT APPLICATIONS

This application claims the right of priority under 35 U.S.C. §119 based on Australian Patent Application No. 2003903994, filed 31 Jul. 2003, which is incorporated by reference herein in its entirety as if fully set forth herein.

FIELD OF THE INVENTION

The present invention relates generally to image processing and, in particular, to a method and apparatus for editing a document. The present invention also relates to a computer program product including a computer readable medium having recorded thereon a computer program for editing a document.

BACKGROUND

There are two well-known models for exchanging data between a plurality of computers connected together over a network. The first model is known as the "client/server model", in which a client computer (i.e., a client) sends a request for data to a server computer (i.e., a server) and waits for a response. Such a server typically has a relatively large bandwidth, processing power and storage capacity and is responsible for indexing, locating, retrieving, storing, caching and securing data. The server extracts the data from a relational database, for example, and, transmits the requested data to the client in response to a client request. The server also ensures data integrity and enforces any access policy associated with the requested data.

The server is usually maintained by a "data-publisher", which is configured to "publish" the data. Such publication may include extracting data, building documents to a size based on a request, building tables of the data with user-specified or request-driven ruling, borders, shading, colours, etc, automatic numbering of pages, adjustment of binding margins and table sizes, and formatting of numeric data, for example.

In contrast to servers, clients typically have relatively smaller bandwidth, processing power and storage capacity, and incorporate very simple and limited logic. The primary responsibility of a client is to initiate and complete "transactions" with the server. As such, clients are pure consumers of data published by the server. Users who wish to publish data must upload their data to a server.

The other well-known model for exchanging data between a plurality of computers connected together over a network is known as the "peer-to-peer model", where the term peer refers to each of the computers connected together over the network. The peer-to-peer model is a fully distributed and decentralised model. The peers connected to a network are considered to be equal and there are no peers with special administrative roles. The peers are organised in a flat (i.e. non-hierarchical) structure and connections are formed in an ad-hoc manner. Any peer can "publish" data to, and "consume" data from, any other peer. Such peers are considerably more complex than the clients discussed above and often come in a variety of hardware and software configurations.

Many applications have been developed in order to allow documents to be shared across a network on a computer system implementing the peer-to-peer model. Such applications typically support document versioning (i.e., the creation of different versions of a document) and the storage of such documents so that the different versions representing drafts in the evolution of the document can be retrieved at a later time. This allows a number of different users to make collaborative changes to a document, where the changes can be subsequently merged to produce the final document.

As an example, one application known as the "Concurrent Versions System (CVS)™" supports the merging of collaborative changes to text documents, where these changes comprise the addition, deletion, and modification of lines of ASCII characters. The CVS software typically implements an archive on a central server to which all documents must be compared. Conflicting versions of a document can be merged. However, the result of such merging is the concatenating of pieces of text data from one and another version of a document, without any regard to the semantics of such data.

The CVS software application also allows for the protection of documents, where a user can prevent other users from editing a document while he/she works on the document. However, such protection slows down any collaborative work on a document considerably.

Some software applications (e.g. the Gnutella™ and the FreeNet™ application) allow for the sharing of files between peers without any centralised facilities requiring a server. However, these software applications do not support any kind of collaborative editing.

Other software applications (e.g. the pStore™ and the Chord™ application) allow for data backup and versioning without a central server. For example, the Chord™ software application provides support for distributed data backup, whilst the pStore™ software application implements a versioning system on top of the Chord™ software applications. However, the pStore™ software application does not support distributed versioning (i.e., the creation of different versions of a document on different computers connected to a network) and does not consider the semantics of the data to merge different versions.

A further software application known as the Microsoft™ NetMeeting™ software application, supports a virtual process known as "white-boarding". White-boarding enables multiple people to collaborate on the creation of diagrams and the annotation thereof. However, the Microsoft™ NetMeeting™ software application does not support versioning of the diagrams and associated annotation or the layout of digital images.

Accordingly, none of the above software applications support distributed versioning of documents, other than that provided by the treatment of data as strings of characters that can be inserted and removed. Further, none of the above software applications support collaborative layout editing of a document without a master copy of the document or a central server and without the locking of a document or any part thereof.

Thus, a need clearly exists for an improved method of editing a document, which allows distributed versioning and which allows the merging of multiple versions of a document.

SUMMARY

It is an object of the present invention to substantially overcome, or at least ameliorate, one or more disadvantages of existing arrangements.

According to one aspect of the present invention there is provided a method of editing an electronic document, said method comprising the steps of:

publishing editorial modifications that a first collaborator has made to said document;

acknowledging receipt of said modifications by one or more other collaborators;

merging the published modifications with any local modifications to produce a merged version of said modifications; and applying the merged modifications to said document to produce an edited version of said document including said editorial modifications, said edited version containing data incorporated therein indicating acknowledgment of said editorial modifications by one or more of said collaborators.

According to another aspect of the present invention there is provided a method of editing a document over a network, said method comprising the steps of:

transmitting editorial modifications to said document over said network from a first location to a second location upon said editorial modifications being made to said document at said first location by a first collaborator; and applying said editorial modifications to a version of said document stored at said second location, to produce an edited version of said document, said edited version comprising data incorporated therein indicating acknowledgment of said editorial modifications by one or more other collaborators.

According to still another aspect of the present invention there is provided a method of synchronising versions of a document modified collaboratively over a network, said method comprising the steps of:

determining a most recent version of said document that is stored locally on said network by analysing data incorporated within one or more locally stored versions of said document, said data indicating acknowledgment of a particular version of said document by one or more collaborators;

requesting editorial modifications made to said most recent version of said document by any one or more of said collaborators at one or more remote locations of said network; and applying said editorial modifications to said most recent version of said document to produce synchronised version of said document.

According to still another aspect of the present invention there is provided an apparatus for editing an electronic document, said apparatus comprising:

publishing means for publishing editorial modifications that a first collaborator has made to said document;

acknowledgment means for acknowledging receipt of said modifications by one or more other collaborators;

merging means for merging the published modifications with any local modifications to produce a merged version of said modifications; and modification application means for applying the merged modifications to said document to produce an edited version of said document including said editorial modifications, said edited version containing data incorporated therein indicating acknowledgment of said editorial modifications by one or more of said collaborators.

According to still another aspect of the present invention there is provided an apparatus for editing a document over a network, said apparatus comprising the steps of:

transmission means for transmitting editorial modifications to said document over said network from a first location to a second location upon said editorial modifications being made to said document at said first location by a first collaborator; and modification application means for applying said editorial modifications to a version of said document stored at said second location, to produce an edited version of said document, said edited version comprising data incorporated therein indicating acknowledgment of said editorial modifications by one or more other collaborators.

According to still another aspect of the present invention there is provided an apparatus for synchronising versions of a document modified collaboratively over a network, said apparatus comprising:

version determining means for determining a most recent version of said document that is stored locally on said network by analysing data incorporated within one or more locally stored versions of said document, said data indicating acknowledgment of a particular version of said document by one or more collaborators;

modification requesting means for requesting editorial modifications made to said most recent version of said document by any one or more of said collaborators at one or more remote locations of said network; and modification application means for applying said editorial modifications to said most recent version of said document to produce synchronised version of said document.

According to still another aspect of the present invention there is provided a program for editing an electronic document, said program comprising:

code for publishing editorial modifications that a first collaborator has made to said document;

code for acknowledging receipt of said modifications by one or more other collaborators;

code for merging the published modifications with any local modifications to produce a merged version of said modifications; and code for applying the merged modifications to said document to produce an edited version of said document including said editorial modifications, said edited version containing data incorporated therein indicating acknowledgment of said editorial modifications by one or more of said collaborators.

According to still another aspect of the present invention there is provided a program for editing a document over a network, said program comprising:

code for transmitting editorial modifications to said document over said network from a first location to a second location upon said editorial modifications being made to said document at said first location by a first collaborator; and code for applying said editorial modifications to a version of said document stored at said second location, to produce an edited version of said document, said edited version comprising data incorporated therein indicating acknowledgment of said editorial modifications by one or more other collaborators.

According to still another aspect of the present invention there is provided a program for synchronising versions of a document modified collaboratively over a network, said program comprising:

code for determining a most recent version of said document that is stored locally on said network by analysing data incorporated within one or more locally stored versions of said document, said data indicating acknowledgment of a particular version of said document by one or more collaborators;

code for requesting editorial modifications made to said most recent version of said document by any one or more of said collaborators at one or more remote locations of said network; and code for applying said editorial modifications to said most recent version of said document to produce synchronised version of said document.

According to still another aspect of the present invention there is provided a computer program product including a computer readable medium having recorded thereon a computer program for editing an electronic document, said program comprising:

code for publishing editorial modifications that a first collaborator has made to said document;

code for acknowledging receipt of said modifications by one or more other collaborators;

code for merging the published modifications with any local modifications to produce a merged version of said modifications; and code for applying the merged modifications to said document to produce an edited version of said document including said editorial modifications, said edited version containing data incorporated therein indicating acknowledgment of said editorial modifications by one or more of said collaborators.

According to still another aspect of the present invention there is provided a computer program product including a computer readable medium having recorded thereon a computer program for editing a document over a network, said program comprising:

code for transmitting editorial modifications to said document over said network from a first location to a second location upon said editorial modifications being made to said document at said first location by a first collaborator; and code for applying said editorial modifications to a version of said document stored at said second location, to produce an edited version of said document, said edited version comprising data incorporated therein indicating acknowledgment of said editorial modifications by one or more other collaborators.

According to still another aspect of the present invention there is provided a computer program product including a computer readable medium having recorded thereon a computer program for synchronising versions of a document modified collaboratively over a network, said program comprising:

code for determining a most recent version of said document that is stored locally on said network by analysing data incorporated within one or more locally stored versions of said document, said data indicating acknowledgment of a particular version of said document by one or more collaborators;

code for requesting editorial modifications made to said most recent version of said document by any one or more of said collaborators at one or more remote locations of said network; and code for applying said editorial modifications to said most recent version of said document to produce synchronised version of said document.

BRIEF DESCRIPTION OF THE DRAWINGS

One or more embodiments of the present invention will now be described with reference to the drawings and appendices, in which.

DETAILED DESCRIPTION INCLUDING BEST MODE

Figure 1:
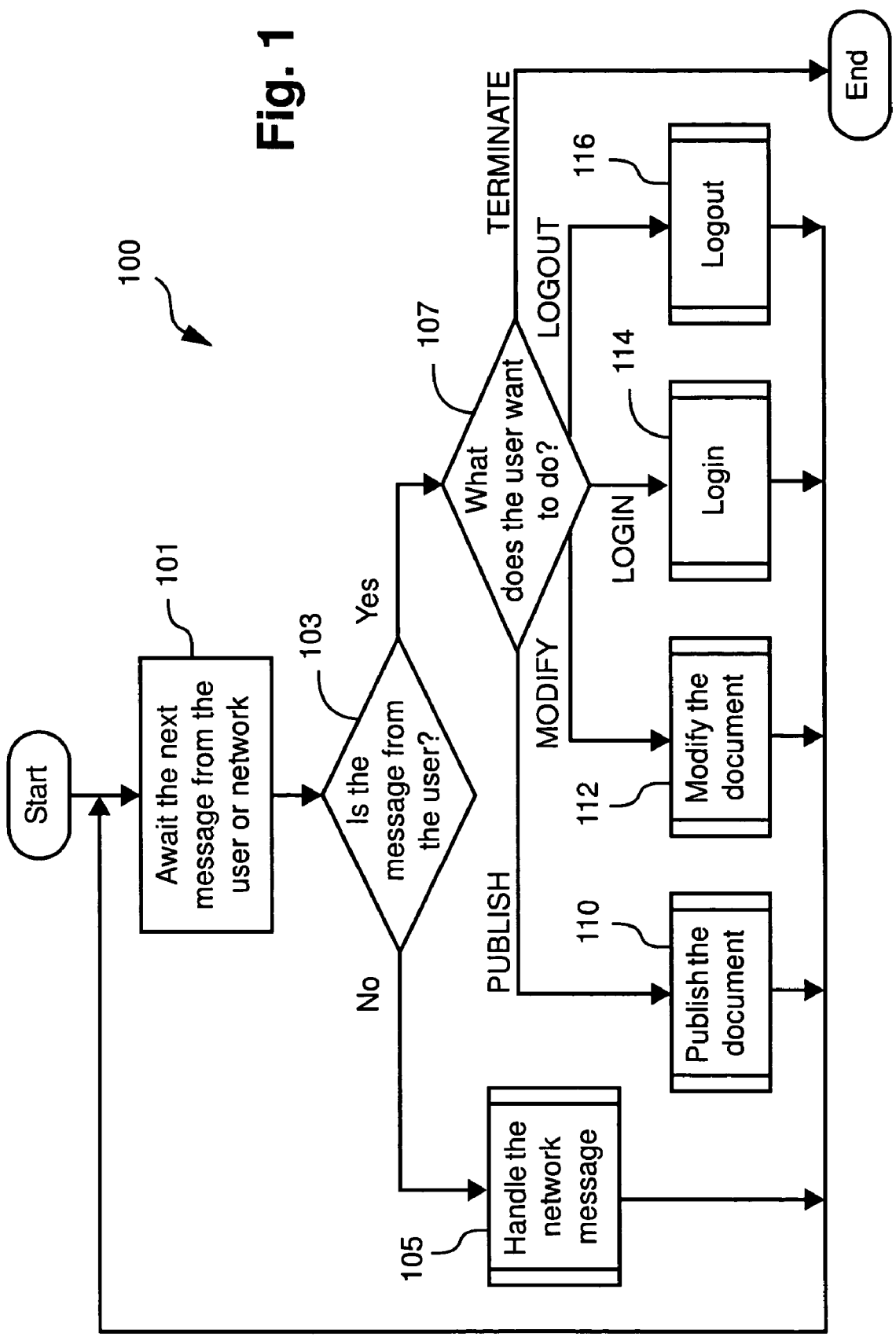
FIG. 1 is a flow diagram of a method of editing a document according to the present disclosure.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Before proceeding with a description of the embodiments, a brief review of terminology used throughout this description will now be discussed.

The term "document" refers to a layout document for an associated digital photo album. The term "layout" refers to the positions, sizes and rotations of images in the associated album. The term "patch" refers to a modification that can be applied to a document to turn the document into another document (e.g. the "patch B-A" applied to document A will yield document B). Further, the acronym "UUID" refers to a universally-unique identifier, as will be explained in detail below.

A method 100 (as seen in FIG. 1) of editing a document is described below with reference to FIGS. 1 to 19. For ease of explanation, the steps of the method 100 are described with reference to the collaborative editing of the layout of a digital photo album. However, it is not intended that the present invention be limited to the described method. For example, the invention may have application to the editing of any other type of electronic document such as a text document.

The method 100 allows users to cooperatively and/or competitively edit the layout of images in a digital photo album. For example, the method 100 allows for the simultaneous modification of a document by one or more users, so as to alter the position, scale or rotation of different images or possibly the same image. Such alterations to an image may augment each other or cancel each other out.

Figure 2:
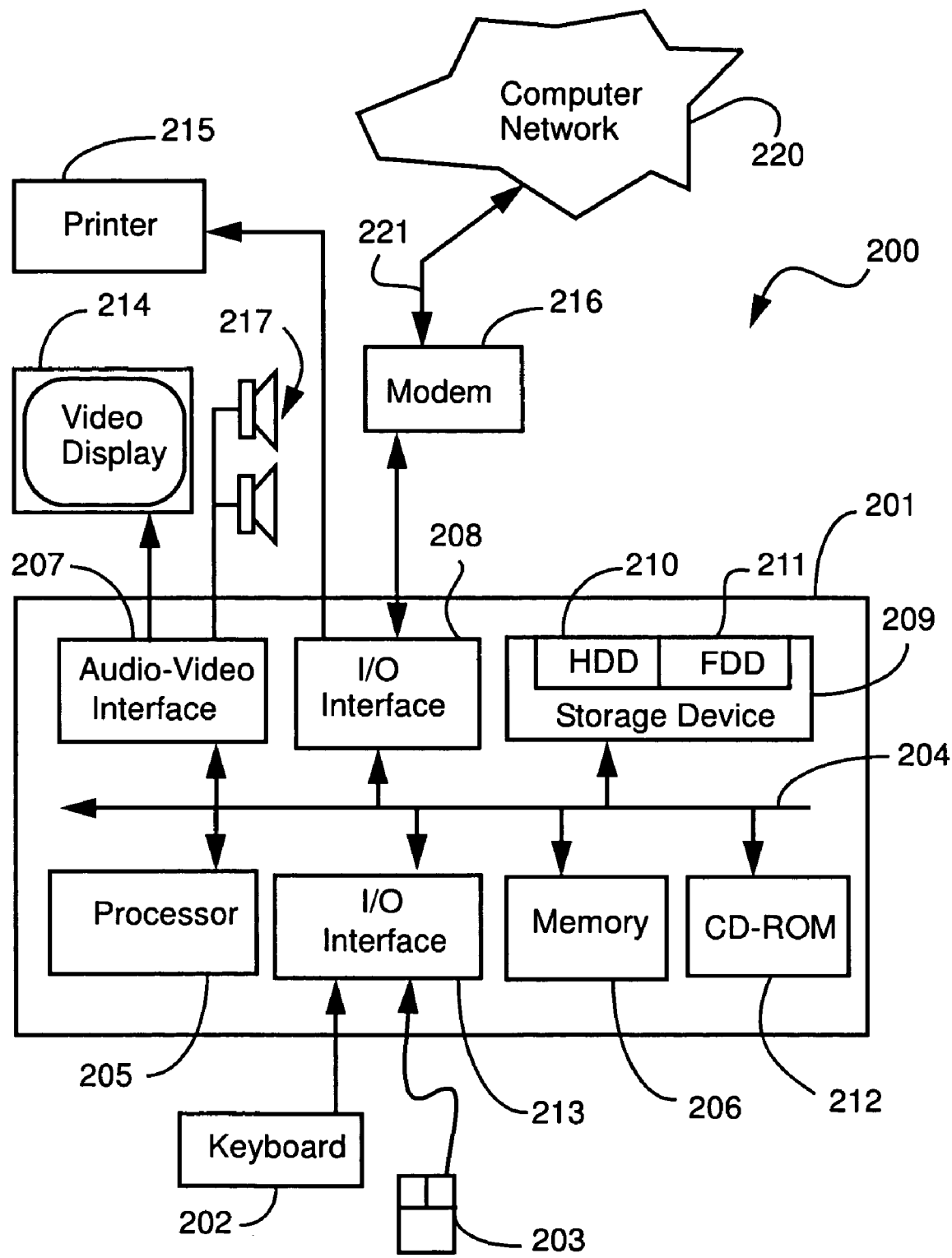
FIG. 2 is a schematic block diagram of a general-purpose computer upon which arrangements described can be practiced.

The method 100 is preferably practiced using a general-purpose computer system 200, such as that shown in FIG. 2 wherein the processes of FIGS. 1 and 3 to 19 may be implemented as software, such as an application program executing within the computer system 200. In particular, the steps of method 100 of editing a document are effected by instructions in the software that are carried out by the computer. The instructions may be formed as one or more code modules, each for performing one or more particular tasks. The software may also be divided into two separate parts, in which a first part performs the method 100 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the method 100.

The computer system 200 is formed by a computer module 201, input devices such as a keyboard 202 and mouse 203, output devices including a printer 215, a display device 214 and loudspeakers 217. A Modulator-Demodulator (Modem) transceiver device 216 is used by the computer module 201 for communicating to and from a communications network 220, for example connectable via a telephone line 221 or other functional medium. The modem 216 can be used to obtain access to the Internet, and other network systems, such as a Local Area Network (LAN) or a Wide Area Network (WAN), and may be incorporated into the computer module 201 in some implementations. In this manner, the computer 200 can permit transmission of messages to remote computers 250, 252 connected to the network 220.

The computer module 201 typically includes at least one processor unit 205, and a memory unit 206, for example formed from semiconductor random access memory (RAM) and read only memory (ROM). The module 201 also includes an number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the modem 216 and printer 215. In some implementations, the modem 2116 may be incorporated within the computer module 201, for example within the interface 208. A storage device 209 is provided and typically includes a hard disk drive 210 and a floppy disk drive 211. A magnetic tape drive (not illustrated) may also be used. A CD-ROM drive 212 is typically provided as a non-volatile source of data. The components 205 to 213 of the computer module 201, typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations or alike computer systems evolved therefrom.

Typically, the application program is resident on the hard disk drive 210 and read and controlled in its execution by the processor 205. Intermediate storage of the program and any data fetched from the network 220 may be accomplished using the semiconductor memory 206, possibly in concert with the hard disk drive 210. In some instances, the application program may be supplied to the user encoded on a CD-ROM or floppy disk and read via the corresponding drive 212 or 211, or alternatively may be read by the user from the network 220 via the modem device 216. Still further, the software can also be loaded into the computer system 200 from other computer readable media. The term "computer readable medium" as used herein refers to any storage or transmission medium that participates in providing instructions and/or data to the computer system 200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of transmission media include radio or infrared transmission channels as well as a network connection to another computer or networked device, and the Internet or Intranets including e-mail transmissions and information recorded on Websites and the like.

The method 100 of editing a document may alternatively be implemented in dedicated hardware such as one or more integrated circuits performing the functions or sub functions of the method 100. Such dedicated hardware may include graphic processors, digital signal processors, or one or more microprocessors and associated memories.

As will be explained in detail below, the method 100 is executed when a user creates a document (i.e., a digital photo album) and associated layout on the computer 200, for example. The document and the associated layout can be published over the network 220 to a list of one or more recipients (i.e, a PUBLISH event) configured within the document. These recipients are hereinafter referred to as collaborators. Some or all of the collaborators can modify (i.e., further enhance) the layout of the published photo album and publish the modifications (i.e., a MODIFY event) over the network 220. During the execution of the method 100, one or more of the collaborators may log in and/or out of an editing session for the document on the network 220 (i.e., LOGIN and LOGOUT events).

While the collaborators are logged into the current editing session they are referred to as active collaborators. A list of active collaborators (ie., those collaborators currently logged into a current editing session for the document) is preferably configured within memory 206. The receipt of the published document and any modifications thereto can be acknowledged by the collaborators of the originally published document (i.e., ACK_DOC and ACK_MODIFY events). Subsequently, simultaneous modifications to the published document can be merged with the originally published document.

The method 100 of editing a document is preferably implemented as software resident on the hard disk drive 210 and being controlled in its execution by the processor 205. The method 100 begins at step 101, where the processor 205 detects a request (i.e., a message) entered via the keyboard 202 or mouse 203 or received over the network 220 from another computer (e.g., servers 295, 299) connected to the network 220. Upon receiving such a message, the method 100 proceeds to step 103, where the message is examined by the processor 205 to determine the source of the message. If the message originates from the keyboard 202 or mouse 203, then the method 100 proceeds to step 107. Otherwise, if the message originated from the network 220, then the method 100 proceeds to step 105, where the processor 205 processes the network message and then returns to step 101. A method 300 for processing the network message as executed at step 105 will be explained below with reference to FIG. 3.

At step 107, if the processor 205 determines that the document (i.e., a photo album) is to be published (i.e., a PUBLISH message is detected) then the method 100 proceeds to step 110. At step 110 the document is transmitted to one or more collaborators as will be described below with reference to FIG. 11, and execution returns to step 101. The published document includes information, hereinafter referred to as 'version information', embedded therein. The version information includes a version string identifying the current version of the document. The version information can also indicate the name (i.e., a username) of the author of the document, which of the collaborators have acknowledged receiving the latest version of the document, and the UUID (i.e., a universally-unique identifier) of the document. The UUID of the document is the same for each of the versions of a document (i.e., the original document and a modified version of the original document both have the same UUID albeit with a different version number).

If the processor 205 determines that the document is to be modified (i.e., a MODIFY message is detected), at step 107, then execution proceeds to step 112. At step 112, the processor 205 transmits a patch representing a modification to the document, over the network 220 to one or more collaborators as will described below with reference to FIG. 12, and execution returns to step 101.

Any modifications to the originally published document made by one or more of the collaborators listed within the document can be subsequently merged. In accordance with the method 100, a distinction is made between the merging of simultaneous modifications to the document made by different collaborators who were both online (ie., active collaborators) at the time that the modifications were made and modifications that were made while one or more of the collaborators were offline. In the instance that the collaborators who edited the published document (e.g, a photo album) were all online, the method 100 assumes that each of the collaborators were aware of modifications made by the any one or more of the other collaborators. The merging of such modifications can then be performed by simply executing each of the modifications.

If one or more of the collaborators who edited the published document were offline, then the collaborators may have been attempting to make the same modification. In this instance, the merging of the modifications to the document accounts for the users being offline. In particular, modifications to different images of the document are independent just as changes to different parameters of the same image of the document are considered to be independent. However, modifications made to the same parameter of the same image of the document are not considered to be independent. In this instance, an average of the result of the simultaneous modification can be determined. As will be explained in more detail below, such an average can be determined for two or more collaborators of the originally published document.

Further, modifications can be commutative so that the result of the modifications does not depend on the order in which the modifications are performed. In this instance, if only one modification to a parameter of an image object is requested, then that change can simply be executed as requested.

An example of combining modifications in a document is the addition of modifications to the position vector of an image object and the addition of the resultant of modification to the position of the object. A further example, is the multiplication of scale factors together before scaling an object by the result of the modification. A still further example, is the addition of angles of rotation and the rotation of the object by the resulting angle.

An example of averaging modifications to an object includes taking the weighted arithmetic mean of modifications to the position vector of the object and adding the resultant mean value to the position of the object. Further averaging examples include the calculation of a weighted geometric mean of scale factors for an object before scaling the object by the resultant mean; or taking the weighted mean of rotation angles of an object and rotating the object by the resultant mean.

A weighted arithmetic mean $\bar{x}$ can be determined in accordance with the described methods as follows:

$$\bar{x} = \frac{\sum_i w_i x_i}{\sum_i w_i} \qquad (1)$$

where $x_i$ represents the value of the object parameters (i.e., position, rotation and scale) and $w_i$ represents weights associated with the collaborators who approved each different version of a corresponding document.

A weighted geometric mean can be calculated in accordance with the described methods as follows:

$$\bar{x} = \left(\prod_i x_i^{w_i}\right)^{1/\sum_i w_i} \qquad (2)$$

where again $x_i$ represents the values of the object parameters and the weights, $w_i$, are associated with the collaborators who approved each different version of a corresponding document. Different weights can be assigned to different modifications made to an originally published document, such that the opinion of a particular collaborator is considered more valuable than the opinion of another, for example.

An alternative to taking weighted averages of modifications made to a particular object as described above is to use weights to vote on a preferred modification to an object, such that document modifications are merged by election. As an example, for a document edited by two different collaborators, let:

$x_{v,j}$: represent the position of the $j^{th}$ image of the $v^{th}$ version of the document;

$s_{v,j}$: represent the scale factor of the $j^{th}$ image of the $v^{th}$ version of the document;

$r_{v,j}$: represent the rotation angle of the $j^{th}$ image of the $v^{th}$ version of the document;

old: represent the last common version of the document that the two different collaborators had in common; and labels 1 and 2: represent conflicting versions of the document.

Assume three collaborators (i.e., one of the authors of the original document and two other collaborators) approved version 1 of the document, but only one collaborator (i.e., the same author) has approved version 2 of the document. Any change to an image parameter that was made by only one of the collaborators can be accepted in accordance with the change. However, if more than one collaborator has changed the position, scale factor, and rotation angle of the $j^{th}$ image, then the weighted arithmetic mean of the modifications can be used to determine a value for the first and third parameter of the document.

For example, the position and rotation parameter for a resultant document can be determined by using ¾ of the position and rotation parameter value for the $1^{st}$ version of the document plus ¼ of the position and rotation parameter value for the $2^{nd}$ version of the document as follows:

$$\left(\frac{3}{4}r_1 + \frac{1}{4}r_2\right) \quad (3)$$

The scale factor for the $j^{th}$ image of the resultant document can be determined by determining a weighted geometric mean of the edited scale factors for the $1^{st}$ and $2^{nd}$ version of the document. The weighted geometric mean can be determined by taking the $4^{th}$ root of the product of the scale factor, cubed, for the $j^{th}$ image of the $1^{st}$ version of the document and the scale factor for the $j^{th}$ image of the $2^{nd}$ version of the document as follows:

$$\{\text{fourth root}\}\sqrt{s_1^3 s_2} \quad (4)$$

Discrete modifications to a document such as the addition or deletion of one or more images are independent of each other. Therefore, such modifications can be merged by executing each of the modifications.

Two different images can be added to a document simultaneously as each image addition is requested. If more than one request for the addition of the same image occurs, then one copy of the image can be added to the document. The position, rotation and scaling of the added image can be determined using the weighted mean (i.e., Equation (1)) as described above.

Modifications to document image parameters (i.e., position, rotation, and scale parameters) are typically highly context-sensitive (e.g. scaling up an image to make a page appear less empty). If a document image is moved to a different page, then that image will be positioned on the new page and all subsequent parameter changes to the image within the original document following the movement of the image are ignored. If several requests are made to move the same image to the same or a different page, a voting mechanism can be used to choose upon which page to place the image. In this instance, a weighted average of context-sensitive parameters can be determined from parameter modifications made on the elected page.

Modifications to a document can be notified to all collaborators as soon as the modifications have been requested. In this instance, network latency can be compensated for by estimating or predicting the result of other modification requests made by other collaborators. Alternatively, modifications to a document can be notified to collaborators upon the modifications being accepted.

Collaborators connected to a network can preferably request a digest of document modifications as the collaborators come on-line (ie., become active collaborators) after being logged off for some period. Alternatively, notifications of document modifications can be e-mailed to collaborators. Such notifications can be transmitted individually or can be periodically packaged into a digest before transmission.

Document layout modifications can be automatically implemented by post-processing using a known least-squares fit method to satisfy a set of layout constraints. For example, objects of a document can be limited to a grid layout.

Returning to the method 100 of FIG. 1, if the processor 205 determines that a login request has been made in relation to a particular document (i.e., a LOGIN event is detected), at step 107, then execution proceeds to step 114. At step 114, the processor 205 transmits a login message over the network 220 to one or more of the collaborators, indicating that the sender of the message is logging into an editing session on the network 220, as will described in more detail below with reference to FIG. 15, and then execution returns to step 101.

Further, in the method 100 of FIG. 1, if the processor 205 determines that a logout request has been made in relation to a particular document (i.e., a LOGOUT event is detected), at step 107, then execution proceeds to step 116. At step 116, the processor 205 transmits a logout message over the network 220 to one or more of the collaborators, indicating that the sender of the message is logging out of an editing session for the document, as will described in more detail below with reference to FIG. 20, and then execution returns to step 101.

Figure 3A:
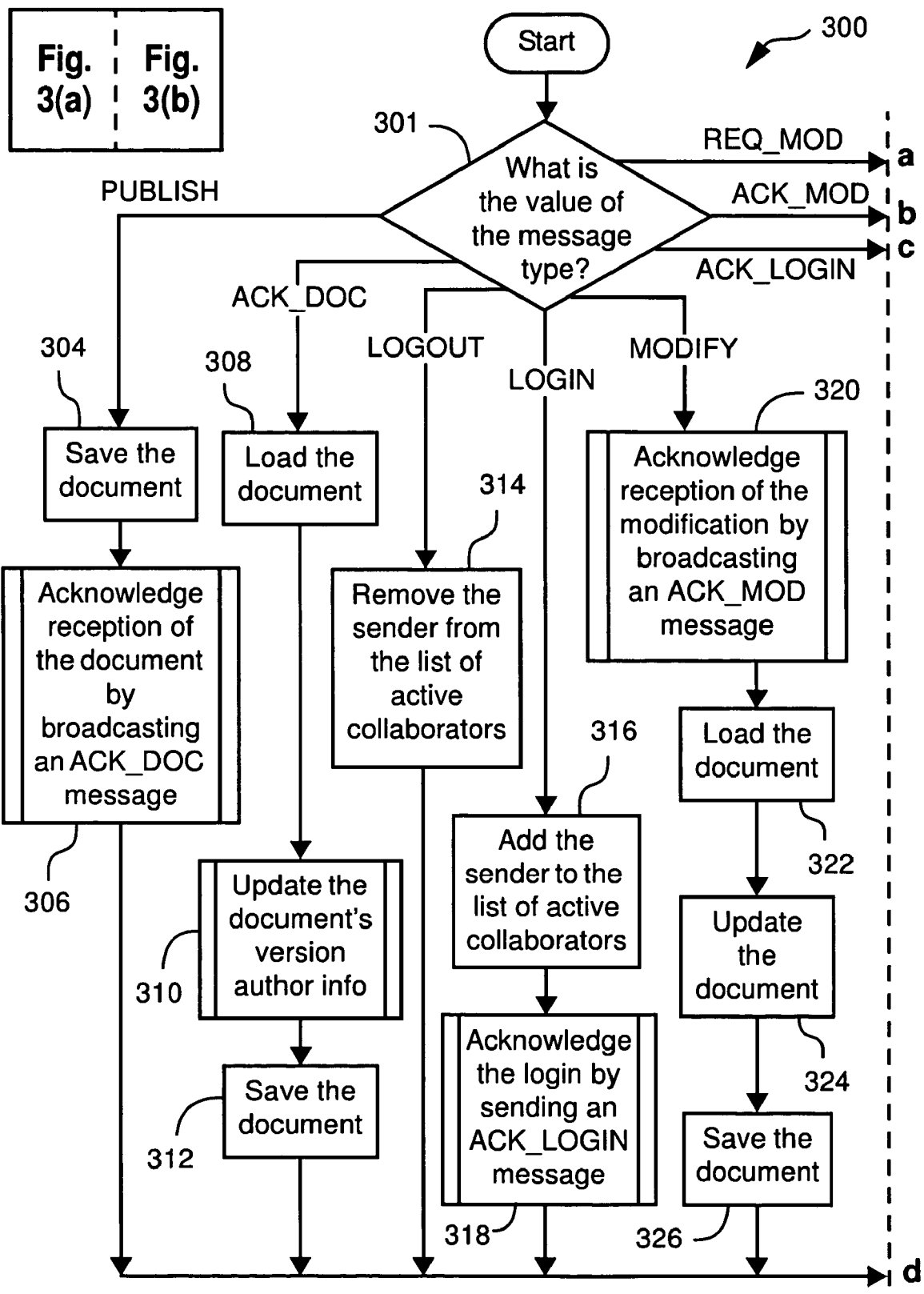
FIG. 3 is a flow diagram showing a method of processing a network message.
Figure 3B:
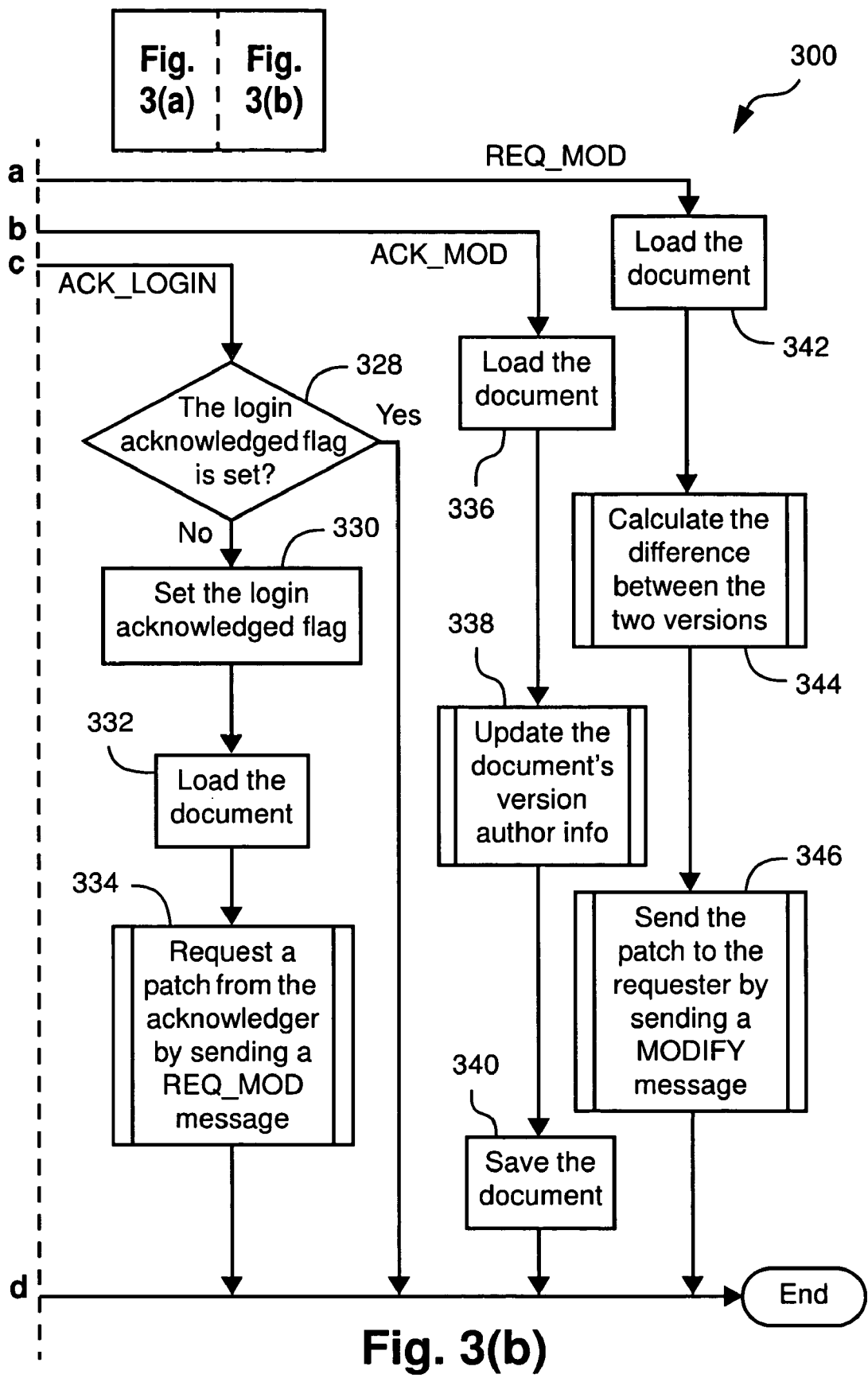

FIG. 3 is a flow diagram showing the method 300 of processing the network message as executed at step 105 of the method 100. The method 300 is preferably implemented as software resident on the hard disk drive 210 and being controlled in its execution by the processor 205.

The method 300 begins at step 301 where the processor 205 detects the message and determines the content of the message. The message can be stored in memory 206.

If the message is a PUBLISH message (i.e., a PUBLISH event has occurred) then execution proceeds to step 304. The PUBLISH message indicates that the originator of the message is broadcasting a version of the document to the active collaborators as listed in the list of active collaborators configured within memory 206. As described above, the version of the document is indicated by the version string embedded within the document.

If the message is an ACK_DOC message (i.e., an ACK_DOC event has occurred), at step 301, then the method 300 proceeds to step 308. The ACK_DOC message indicates that the originator of the message is acknowledging receipt of a version of the document.

If the message is a LOGOUT message (i.e., a LOGOUT) at step 301, then execution proceeds to step 314. The LOGOUT message indicates that the originator of the message is logging out of an editing session for the document on the network 220.

If the message is a LOGIN message (i.e., a LOGIN event), at step 301, then the method 300 proceeds to step 316. The LOGIN message indicates to all active collaborators (ie., those collaborators currently on-line) that the originator of the message is logging into an editing session on the network 220.

If the message is a MODIFY message (i.e., a MODIFY event), at step 301, then execution proceeds to step 320. The MODIFY message indicates to all active collaborators that the originator of the message is transmitting a patch (i.e., a representation of a modification to the document) for the document. The patch is transmitted together with the MODIFY message.

If the message is an ACK_LOGIN message (i.e., an ACK_LOGIN event), at step 301, then the method 300 proceeds to step 328. The ACK_LOGIN message indicates to the recipient of the message that the originator of the message is acknowledging the recipient's logging in to an editing session for a particular document.

If the message is an ACK_MOD message (i.e., an ACK_MOD event), at step 301, then execution proceeds to step 336. The ACK_MOD message indicates to the recipient that the originator is acknowledging receipt of a patch that the recipient has sent to the originator of the message.

If the message is a REQ_MOD message (ie., a REQ_MOD event), at step 301, then the method 300 proceeds to step 342. The REQ_MOD event indicates to the recipient of the message that the originator of the message is requesting any modifications to the document that have been made since the originator previously logged out of the editing session.

At step 304, the document received with the PUBLISH message is saved onto the hard disk drive 210. The method 300 then continues at step 306, where receipt of the document is acknowledged by broadcasting an ACK_DOC message. The ACK_DOC message is transmitted to all active collaborators. The ACK_DOC message is transmitted in accordance with a method 400 of acknowledging receipt of a document, as will be described below with reference to the flow diagram of FIG. 4. Following step 306, the method 300 concludes and execution returns to step 101 of the method 100.

At step 308, a copy of the document stored in the hard disk drive 210 (i.e., the current version of the document stored in hard disk drive 210) is loaded from the hard disk drive 210 into the memory 206, in response to the ACK_DOC message. At the next step 310, the version information embedded within the document is modified in order to add the originator of the message to a list of acknowledgers for the modified version of the document (ie., those collaborators who have acknowledged receiving the modifications to the document). A method 500 of modifying the version information embedded within the document as executed at step 310 will be described below with reference to the flow diagram of FIG. 5. The method 300 continues at the next step 312 where the modified document is saved to the hard disk drive 210 and execution continues at step 101 of the method 100.

At step 314, the originator of the LOGOUT message is removed from the list of active collaborators configured within memory 206 and the method 300 returns to step 101 of the method 100.

At step 316, the originator of the LOGIN message is added to the list of active collaborators configured within the memory 206 and execution proceeds to step 318. At step 318, receipt of the LOGIN message is acknowledged by the transmission of an ACK_LOGIN message to the collaborator who was the originator of the LOGIN message, and execution returns to step 101 of the method 100. A method 600 of transmitting an ACK_LOGIN message as executed at step 318 will be described below with reference to FIG. 6.

At step 320, receipt of a patch is acknowledged by broadcasting an ACK_MOD message over the network 220 to all active collaborators, in response to the MODIFY message. A method 700 of broadcasting an ACK_MOD message over the network 220 to all active collaborators, as executed at step 320, will be described below with reference to FIG. 7. The method 300 then continues at the next step 322, where a copy of the document is loaded from the hard disk drive 210 to memory 206. Then at the next step 324, the document stored in memory 206 is updated in accordance with the patch that was received with the MODIFY message. A method 1300 of updating a document, as executed at step 324, will be described below with reference to FIG. 13. The method 300 then proceeds to step 326, where the modified document is saved to the hard disk drive 210, and execution returns to step 101 of the method 100.

At step 328, if the processor 205 determines that a login acknowledged flag (i.e., indicating that at least one collaborator has acknowledged receiving the LOGIN message) configured within memory 206 is set, in response to the ACK_LOGIN message, then the method 300 concludes and execution returns to step 101 of the method 100. Otherwise, the method 300 proceeds to step 330. The login acknowledged flag indicates whether login by the collaborator using the computer 200 has been acknowledged and therefore the login acknowledged flag must now be set. At step 330, the login acknowledged flag is set by the processor 205 and execution proceeds to step 332. At step 332, a copy of the document is loaded from the hard disk drive 210 to memory 206.

Then at the next step 334, a patch is requested from the collaborator who acknowledged the login (i.e., the originator of the ACK_LOGIN message detected at step 301) by sending the collaborator a REQ_MOD message. The REQ_MOD message indicates to the collaborator which version of the document was the last one that the hard disk drive 210 had in common with the collaborator. A method 800 of transmitting a REQ_MOD message to request a patch from collaborators, as executed at step 334, will be described in detail below with reference to FIG. 8. The method 300 returns to step 101 of the method 100 following execution of the method 800.

At step 336, a copy of the document is loaded from the hard disk drive 210 to memory 206, in response to the processor 205 receiving the ACK_MOD message. Then at the next step 338, the copy of the document is modified in order to add the originator of the message to a list of acknowledgers for the current version of the document (ie., those collaborators who have acknowledged receiving the current version of the document). The method 500 of modifying the version information embedded within the document as executed at step 338 will be described in detail below with reference to FIG. 5. Execution then proceeds to step 340, where the modified document is saved to the hard disk drive 210, and execution returns to step 101 of the method 100.

At step 342, a copy of the document is loaded from the hard disk drive 210 to memory 206, in response to the processor 205 receiving the REQ_MOD message. Then at the next step 344, the processor determines the difference between the latest version stored in memory 206 (i.e., the document loaded from the hard disk drive 210) and the version of the document that has been identified in the REQ_MOD message, as will be described in detail below with reference to FIG. 9. Execution then proceeds to step 346, where a patch representing the difference determined at step 344 is transmitted over the network 220 to the collaborator who originated the REQ_MOD message. The patch is transmitted together with a MODIFY message. A method 1000 of transmitting a MODIFY message, as executed at step 346, will be described in detail below with reference to FIG. 10. The method 300 then concludes and execution proceeds to step 101 of the method 300.

Figure 4:
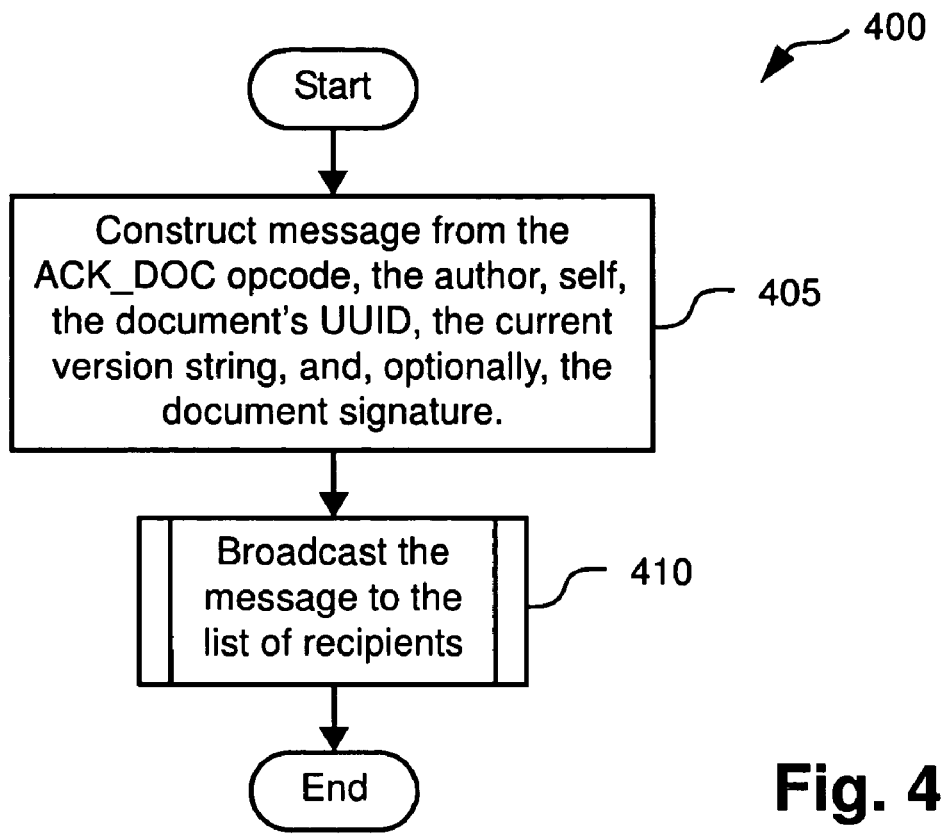
FIG. 4 is a flow diagram showing a method of acknowledging receipt of the document of FIG. 1 in response to a PUBLISH message.

FIG. 4 is a flow diagram showing the method 400 of acknowledging receipt of a document in response to a PUBLISH message being detected by the processor 205, as executed at step 306. The method 400 is preferably implemented as software resident on the hard disk drive 210 and being controlled in its execution by the processor 205.

The method 400 begins at step 405 where the processor 205 constructs an ACK_DOC message from predetermined ACK_DOC opcode. Any suitable opcode for implementing the ACK_DOC message and the other messages described herein can be used. Such opcode will not be described in detail in this document. The ACK_DOC message is constructed using the version information embedded within the document (i.e., the username of the author, the username of the acknowledger, the UUID, the current version string, and optionally, a document hash resulting from applying any suitable hash algorithm (e.g., MD5 or SHA) to the document). At the next step 410, the ACK_DOC message is transmitted over the network 220 to all of the collaborators listed in the list of active collaborators, configured within memory 206, associated with the document. A method 1600 of broadcasting the ACK_DOC message, as executed at step 410, will be described below with reference to FIG. 16. Following step 410, execution returns to step 101 of the method 100.

Figure 5:
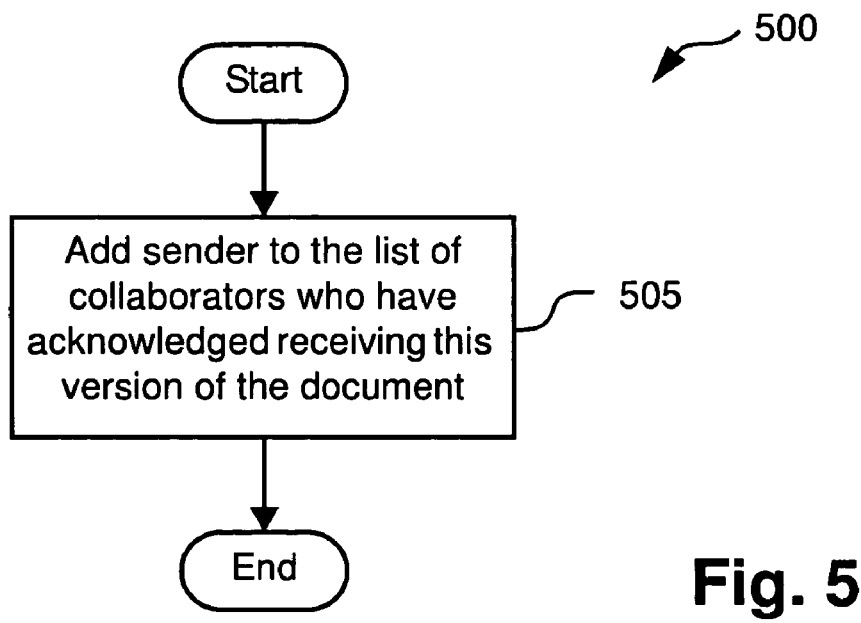
FIG. 5 is a flow diagram showing a method of modifying information embedded within the document of FIG. 1.

The method 500 of modifying the version information embedded within the document, as executed at steps 310 and 338 of the method 300, will now be described with reference to the flow diagram of FIG. 5. The method 500 is preferably implemented as software resident on the hard disk drive 210 and being controlled in its execution by the processor 205.

The method 500 includes only one step 505. At step 505, the username of the collaborator who acknowledged receiving the document, (ie., the originator of the ACK_DOC message) is added to the list of acknowledgers for the current version of the document, which is embedded within the document. Following step 505, execution returns to step 312 or 340 of the method 300, depending on whether the method 500 was invoked from step 310 or step 338 of the method 300.

Figure 6:
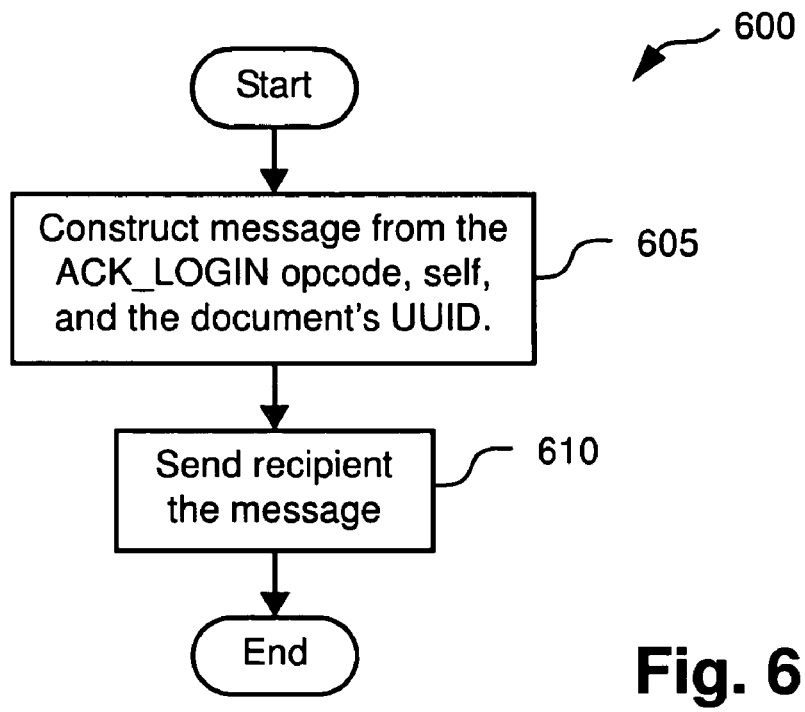
FIG. 6 is a flow diagram showing a method of acknowledging the login to a current editing session by transmitting an ACK_LOGIN message.

The method 600 of transmitting an ACK_LOGIN message, as executed at step 318, will now be described with reference to FIG. 6. The method 600 is preferably implemented as software resident on the hard disk drive 210 and being controlled in its execution by the processor 205.

The method 600 begins at step 605, where the processor 205 constructs the ACK_LOGIN message from a predetermined opcode. The ACK_LOGIN message includes the username of the collaborator acknowledging the login and the UUID of the document to which the collaborator has logged in. The method 600 then proceeds to step 610 where the ACK_LOGIN message is transmitted to the originator of the LOGIN message. Following step 610, execution returns to step 101 of the method 100.

Figure 7:
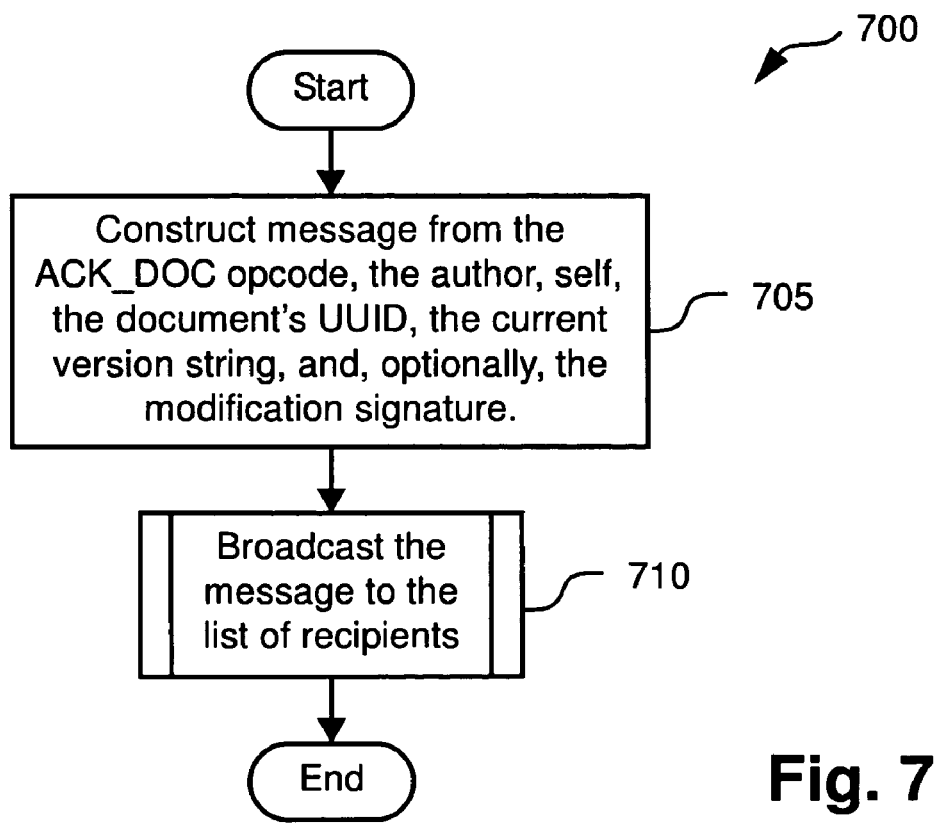
FIG. 7 is a flow diagram showing a method of acknowledging a modification by transmitting an ACK_MOD message.

The method 700 of broadcasting an ACK_MOD message over the network 220 to all active collaborators, as executed at step 320, will be now described below with reference to FIG. 7. The method 700 is preferably implemented as software resident on the hard disk drive 210 and being controlled in its execution by the processor 205.

The method 700 begins at step 705, where the processor 205 constructs the ACK_MOD message. The ACK_MOD message includes the embedded version information associated with the document including the username of the author of the document, the username of the collaborator acknowledging the modification, the document UUID, the current version string, and, optionally, a modification signature for verification purposes. The modification signature can be configured using any known method of generating a digital signature or hash. At the next step 710, the processor 205 broadcasts the message to all active collaborators over the network 220, in accordance with a method 1600 to be described below with reference to FIG. 16.

Figure 8:
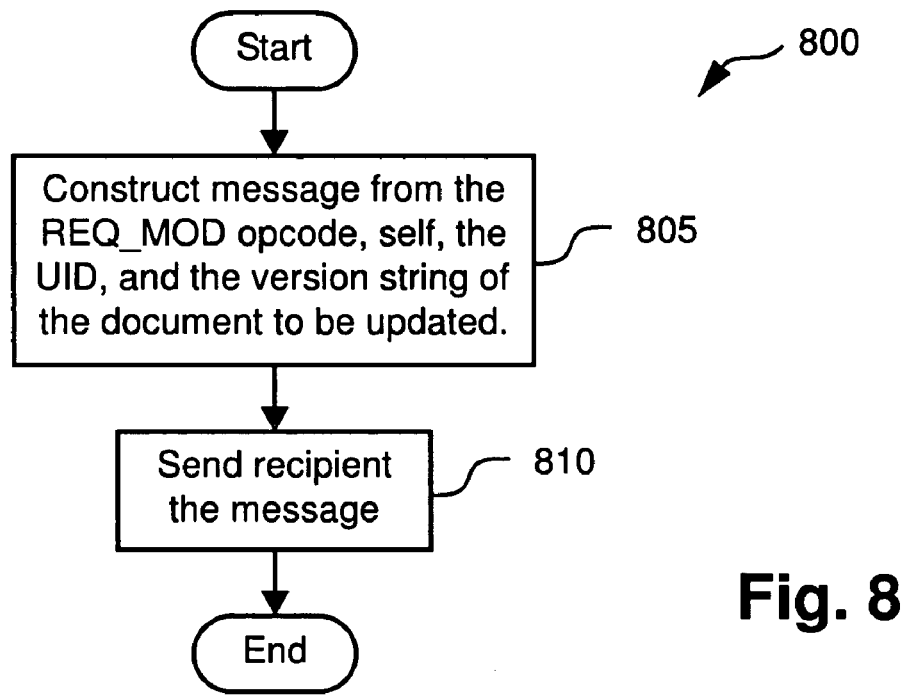
FIG. 8 is a flow diagram showing a method of requesting a modification by transmitting a REQ_MOD message.

The method 800 of transmitting a REQ_MOD message to request a patch from collaborators, as executed at step 334, will be described in detail below with reference to FIG. 8. The method 800 is preferably implemented as software resident on the hard disk drive 210 and being controlled in its execution by the processor 205.

The method 800 begins at the first step 805, where the REQ_MOD message is constructed from predetermined opcode. The REQ_MOD message includes the username of the originator of the REQ_MOD message (i.e., the requestor), the UUID of the document, and the version string of the version of the document which is currently stored in memory 206 and which needs to be updated. Execution then returns to step 101 of the method 100.

Figure 9:
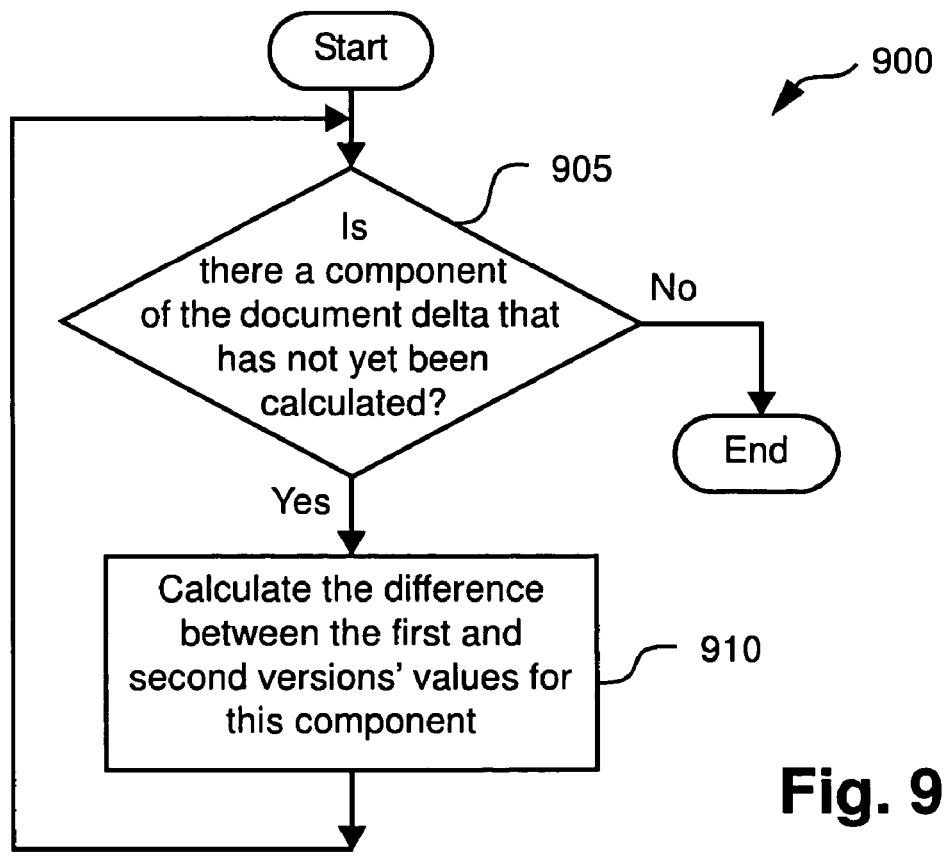
FIG. 9 is a flow diagram showing a method of determining the difference between the current version of a document and another version of the document.

A method 900 of determining the difference (i.e., a patch) between the latest version of the document stored in memory 206 (i.e., the document loaded from the hard disk drive 210) and the version of the document that has been identified in the REQ_MOD message, as executed at step 344 (and step 1315 of FIG. 13), will now be described in detail below with reference to FIG. 9. The method 900 is preferably implemented as software resident on the hard disk drive 210 and being controlled in its execution by the processor 205.

The method 900 begins at step 905, if the processor 205 determines that there is a component (i.e., a current component) of the document stored in memory 206 that is different from a corresponding component in the latest version of the document and requires determination, then the method 900 proceeds to step 910. Otherwise, execution returns to step 346 of the method 300 (or to step 1320 of the method 1300), depending on whether the method 900 was invoked from step 344 (or step 1315). At step 910, a delta value for the current component is set to the difference between the value for the current component for the document stored in memory 206 and the version of the document identified by the REQ_MOD message. Execution then returns to step 905. A patch determined can include one or more delta values, determined in accordance with the method 900, corresponding to one or more document components.

Figure 10:
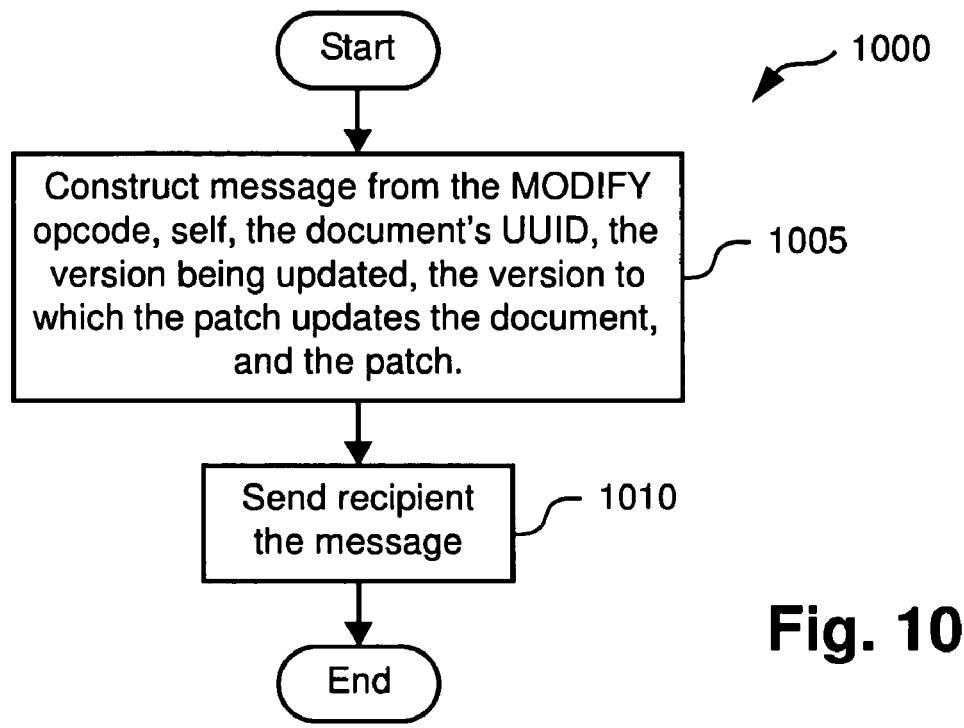
FIG. 10 is a flow diagram showing a method of modifying a document by transmitting a MODIFY message.

The method 1000 of transmitting a MODIFY message, as executed at step 346, will now be described with reference FIG. 10. The method 1000 is preferably implemented as software resident on the hard disk drive 210 and being controlled in its execution by the processor 205.

The method 1000 begins at step 1005, where the MODIFY message is constructed. The MODIFY message includes the patch determined at step 344, the username of the collaborator who created the patch, the UUID for the document, a version string corresponding to the version of the document to which the update applies, and a further version string corresponding to the version to which the patch will update the document. At the next step 1010, the MODIFY message including the patch is transmitted to the collaborator who requested the patch (i.e., the originator of the REQ_MOD message). Following step 1010, execution returns to step 101 of the method 100.

Figure 11:
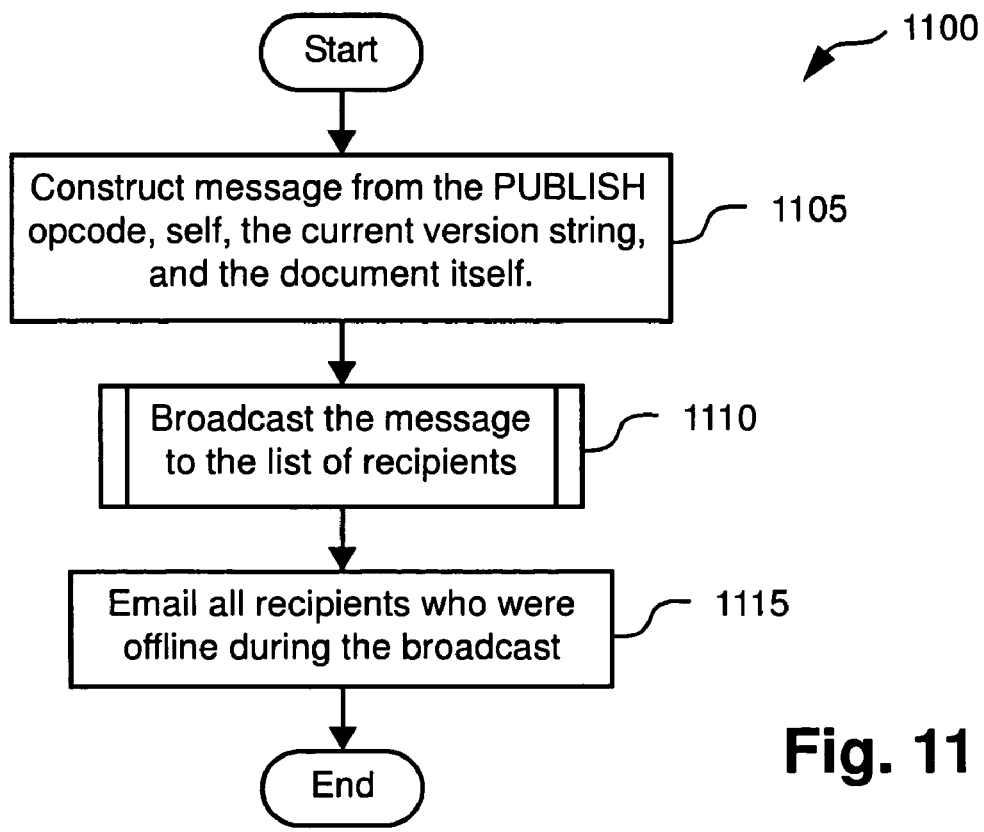
FIG. 11 is a flow diagram showing a method of publishing a document by transmitting a PUBLISH message.

A method 1100 of transmitting a PUBLISH message, as executed at step 110 of the method 100, will now be described with reference FIG. 11. The method 1100 is preferably implemented as software resident on the hard disk drive 210 and being controlled in its execution by the processor 205.

The method 1100 begins at step 1105, where the processor 205 constructs the PUBLISH message from a predetermined opcode. The PUBLISH message includes the username of the collaborator who published the document, a version string corresponding to the document, and the document. At the next step 1110, the PUBLISH message including the document is transmitted to the active collaborators according to the list of active collaborators configured within memory 206, in accordance with a method 1600 shown in FIG. 16. At the next step 1115, the document is emailed to all active collaborators who were offline during the message broadcast of step 1110 (i.e., those collaborators associated with the document who were listed in the list of active collaborators configured within memory 206, but were offline during the broadcast).

When a collaborator receives a published document by email as at step 1115, the receiving collaborator manually copies the document into a directory of a local hard disk drive (e.g., the hard disk drive 210), where an application incorporating the methods described herein is able to locate the document.

Figure 12:
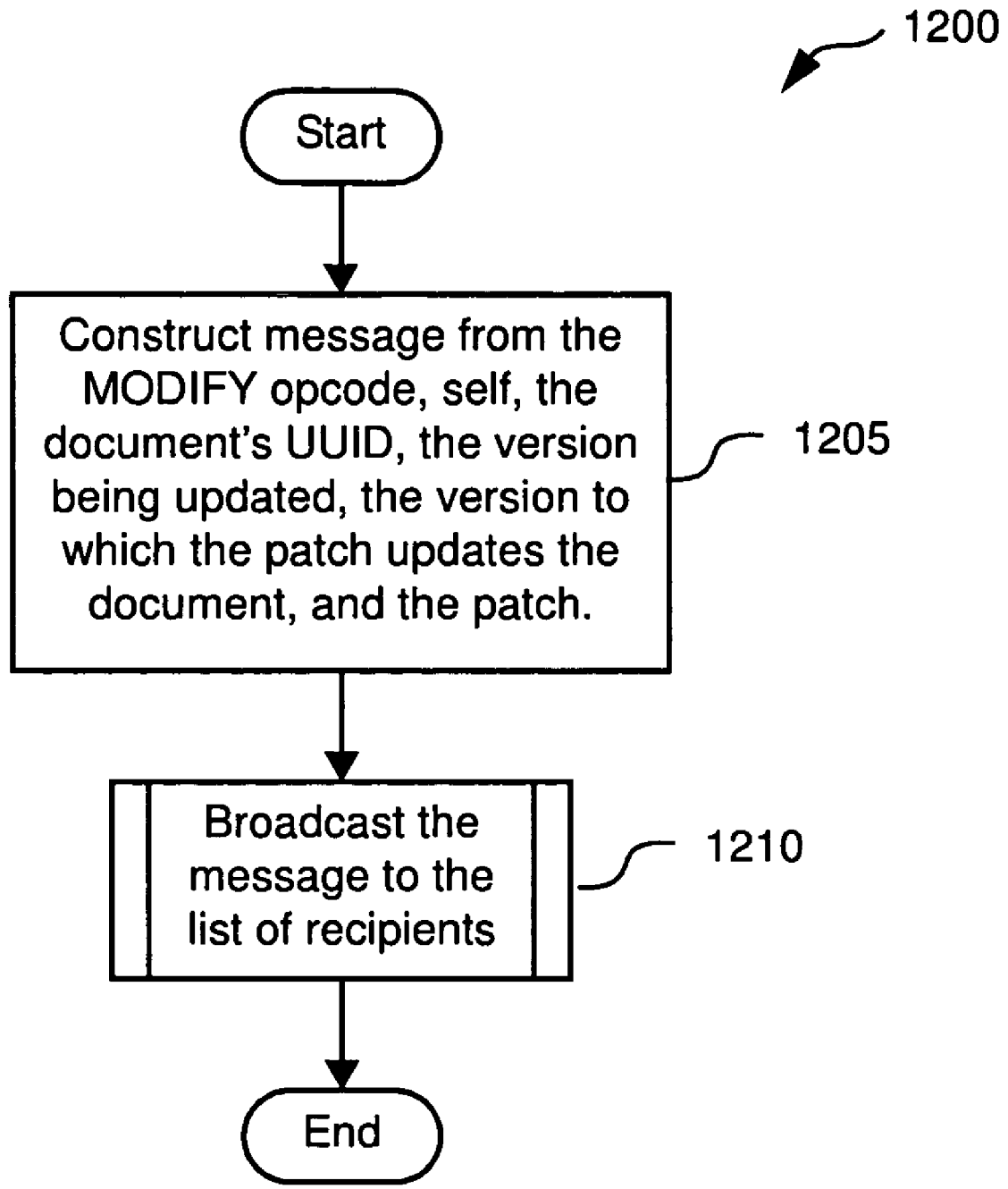
FIG. 12 is a flow diagram showing a further method of transmitting a MODIFY message.

A method 1200 of transmitting a MODIFY message, as executed at step 112 of the method 100, will now be described with reference FIG. 12. The method 1200 is preferably implemented as software resident on the hard disk drive 210 and being controlled in its execution by the processor 205.

The method 1200 begins at step 1205, where the processor 205 constructs the MODIFY message from predetermined opcode. The MODIFY message includes the username of the collaborator who created the patch, a version string corresponding to the document to which the patch applies (i.e., the document which was updated), a further version string corresponding to the version to which the patch will update the document, the patch and the document UUID. At the next step 1210, the MODIFY message including the patch is transmitted to the active collaborators according to the list of active collaborators configured within memory 206, in accordance with a method 1600 shown in FIG. 16.

Figure 13:
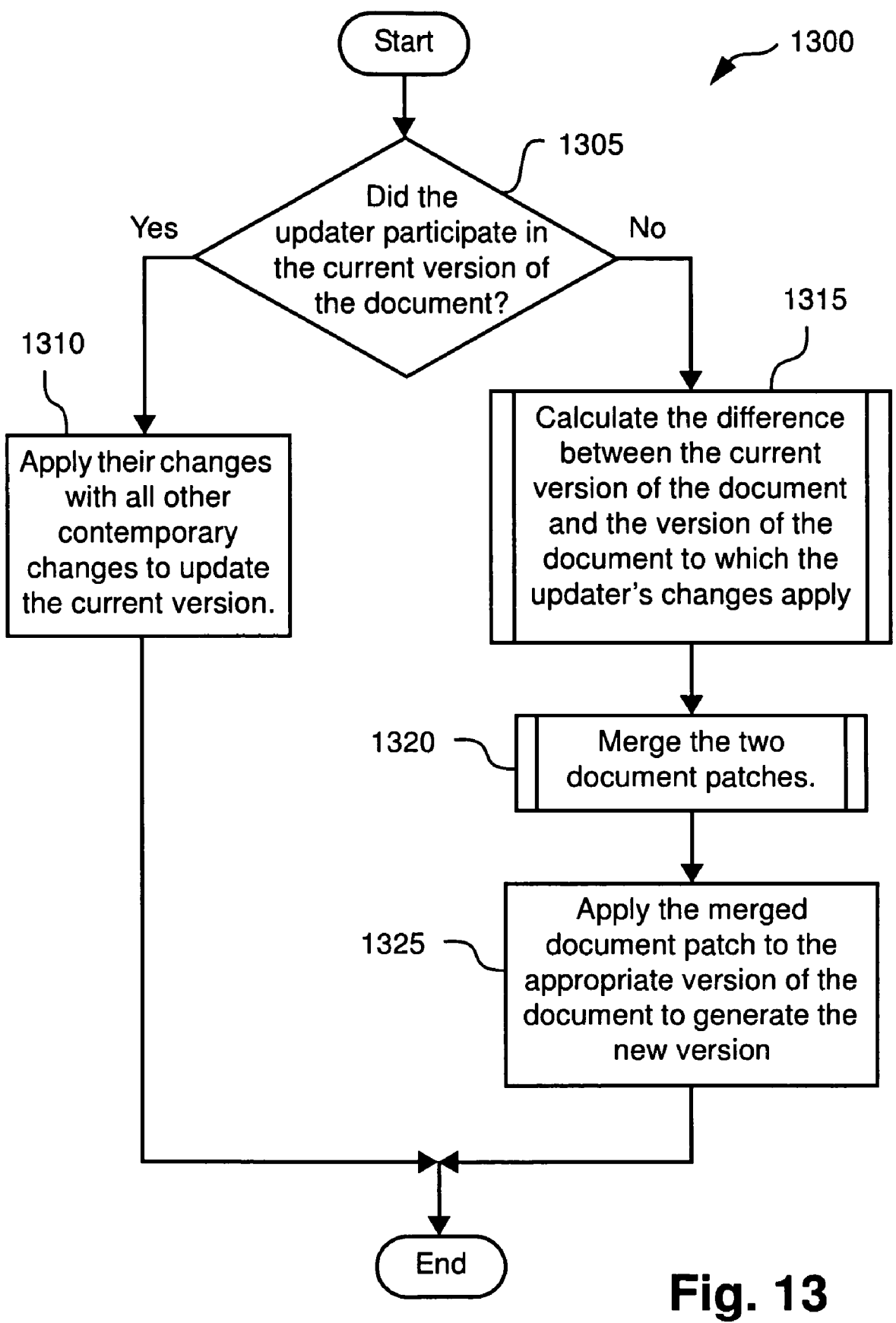
FIG. 13 is a flow diagram showing a method of updating a document.

The method 1300 of updating a document, as executed at step 324, will now be described with reference to FIG. 13. The method 1300 is preferably implemented as software resident on the hard disk drive 210 and being controlled in its execution by the processor 205.

The method 1300 begins at step 1305, where if the processor 205 determines that the originator of the MODIFY message, detected at step 301, participated in the editing of the current version of the document stored in the memory 206, then the method 1300 proceeds to step 1310. Otherwise the method 1300 proceeds to step 1315. At step 1310, the modifications represented by the patch accompanying the MODIFY message are applied to the current version of the document stored in memory 206. Following step 1310, execution proceeds to step 326.

At step 1315, the processor 205 determines a patch representing the difference between the current version of the document stored in memory 206 and the version of the document (i.e., the version of the document represented by the version string) that has been identified in the MODIFY message. Then at the next step 1320, the processor 205 merges the documents by merging the patch that was received with the MODIFY message with the patch determined at step 1315. A method 1400 of merging two patches representing modifications to the document will be described in detail below with reference to FIG. 14. The method 1300 concludes at the next step 1325, where the merged set of document modifications is applied to the current document stored in memory 206. Following step 1325, execution returns to step 326.

Figure 14:
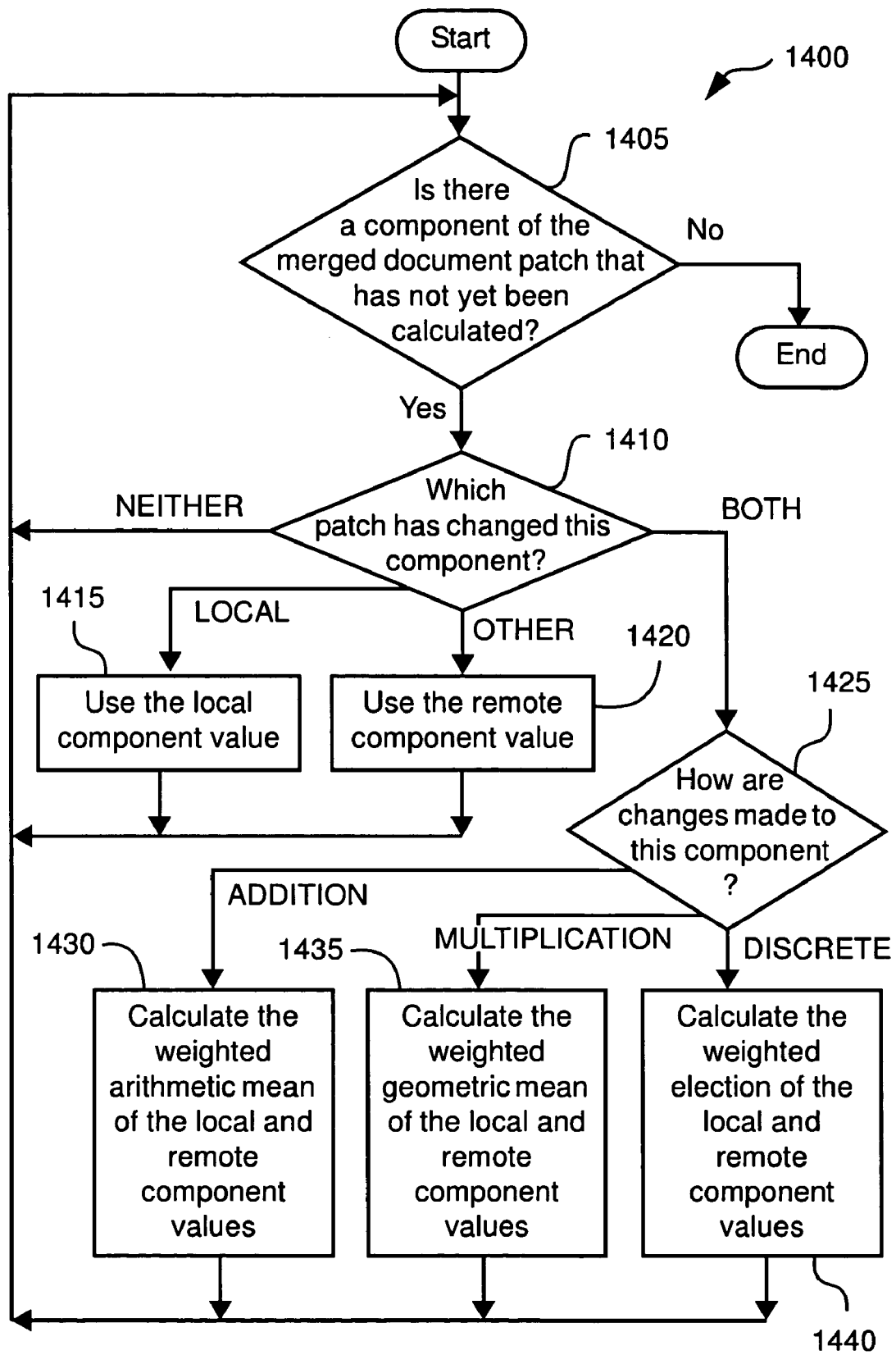
FIG. 14 is a flow diagram showing a method of merging two sets of document modifications.

The method 1400 of merging two patches representing modifications to the document will now be described with reference to FIG. 14. The method 1400 is preferably implemented as software resident on the hard disk drive 210 and being controlled in its execution by the processor 205.

The method 1400 begins at step 1405, where if the processor 205 determines that there is a component (i.e., a current component) of the merged patch that needs to be determined, then the method 1400 proceeds to step 1410. Otherwise, the method 1400 concludes and execution returns to step 1325 of the method 1300.

At step 1410, the processor 205 determines which patch modified the current component identified at step 1405. If neither the patch determined at step 1315 or the patch accompanying the MODIFY message modified the current component, then the method 1400 returns to step 1405.

If the patch determined at step 1315 was responsible for the modification to the current component then the method 1400 proceeds to step 1415. At step 1415, the component value corresponding to the current component of the patch determined at step 1315 is used to modify the component value for the merged document.

If the patch accompanying the MODIFY message detected at step 301 was responsible for the modification to the current component identified at step 1415, then the method 1400 proceeds to step 1420. At step 1415, the component value corresponding to the current component of the patch accompanying the MODIFY message is used to modify the component value for the current component of the merged document.

If both the patch determined at step 1315 and the patch accompanying the MODIFY message modified the current component identified at step 1405, then the method 1400 proceeds to step 1425. At step 1425, the processor 205 determines how to modify the current component.

If sequential modifications to the current component need to be added, then execution continues at step 1430. At step 1430, the value of the current component is set to the weighted arithmetic mean of the component value corresponding to the component of the patch determined at step 1315 and the value corresponding to the component of the patch accompanying the MODIFY message, in accordance with Equation (1) described above.

If sequential modifications to the current component need to be multiplied, then execution continues at step 1435. At step 1435, the value of the current component is set to the weighted geometric mean of the component value corresponding to the component of the patch determined at step 1315 and the value corresponding to the component of the patch accompanying the MODIFY message, in accordance with Equation (2) described above.

If modifications to the current component are discrete (i.e. sequential modifications replace earlier component values by later values), then execution continues at 1440. At step 1440, the value of the current component is set is set to the result of a weighted election, as described above.

Following any one of steps 1430, 1435 and 1440, execution returns to step 1405 of the method 1400.

Figure 15:
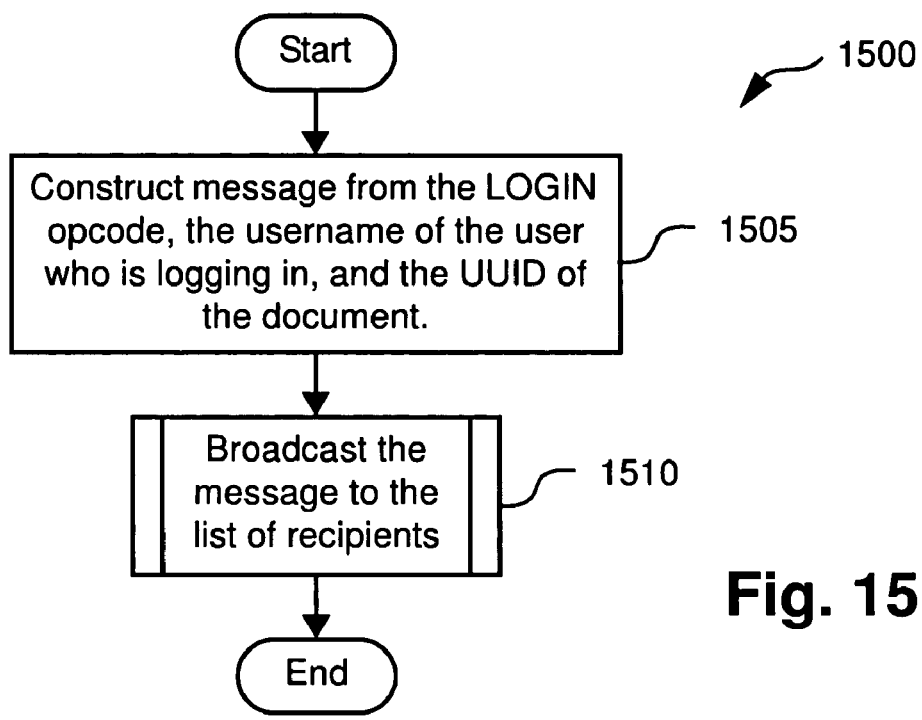
FIG. 15 is a flow diagram showing a method of logging into an editing session by transmitting a LOGIN message.

A method 1500 of transmitting a LOGIN message, as executed at step 114 of the method 100, will now be described with reference FIG. 15. The LOGIN message indicates that the sender of the message is logging into an editing session on the network 220. The method 1500 is preferably implemented as software resident on the hard disk drive 210 and being controlled in its execution by the processor 205.

The method 1500 begins at step 1105, where the processor 205 constructs the LOGIN message. The LOGIN message includes the username of the collaborator who is logging into an editing session on the network 220 and the UUID of the document to which the collaborator is logging in. At the next step 1510, the LOGIN message is transmitted to the active collaborators according to the list of active collaborators configured within memory 206, in accordance with the method 1600 shown in FIG. 16.

Figure 16:
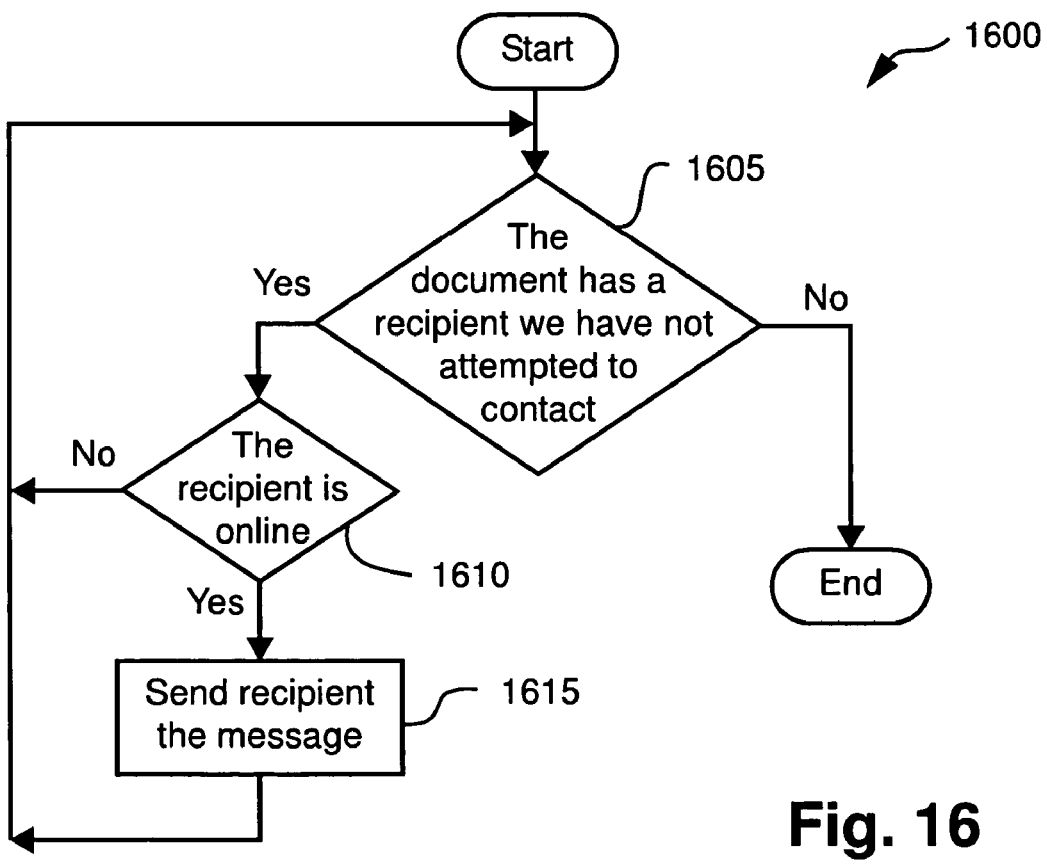
FIG. 16 is a flow diagram showing a method of broadcasting a message to a list of recipients.

A method 1600 of transmitting a message to the active collaborators listed in the document, as executed at steps 410, 710, 1110, 1210, 1510, and 2010, will now be described with reference to FIG. 16. The method 1600 is preferably implemented as software resident on the hard disk drive 210 and being controlled in its execution by the processor 205.

The method 1600 begins at step 1605, where if the processor 205 determines that there has not been an attempt to transmit the message to any one of the active collaborators according to the list of active collaborators configured within memory 206, then the method 1600 proceeds to step 1610. Otherwise execution returns to step 101 of the method 100. At step 1610, if the processor 205 determines that the collaborator identified at step 1605 is not online then the method 1600 returns to step 1605. Otherwise, the method 1600 proceeds to step 1615. At step 1615, the message is transmitted over the network 220 to the collaborator identified at step 1605 and the method 1600 concludes.

Figure 20:
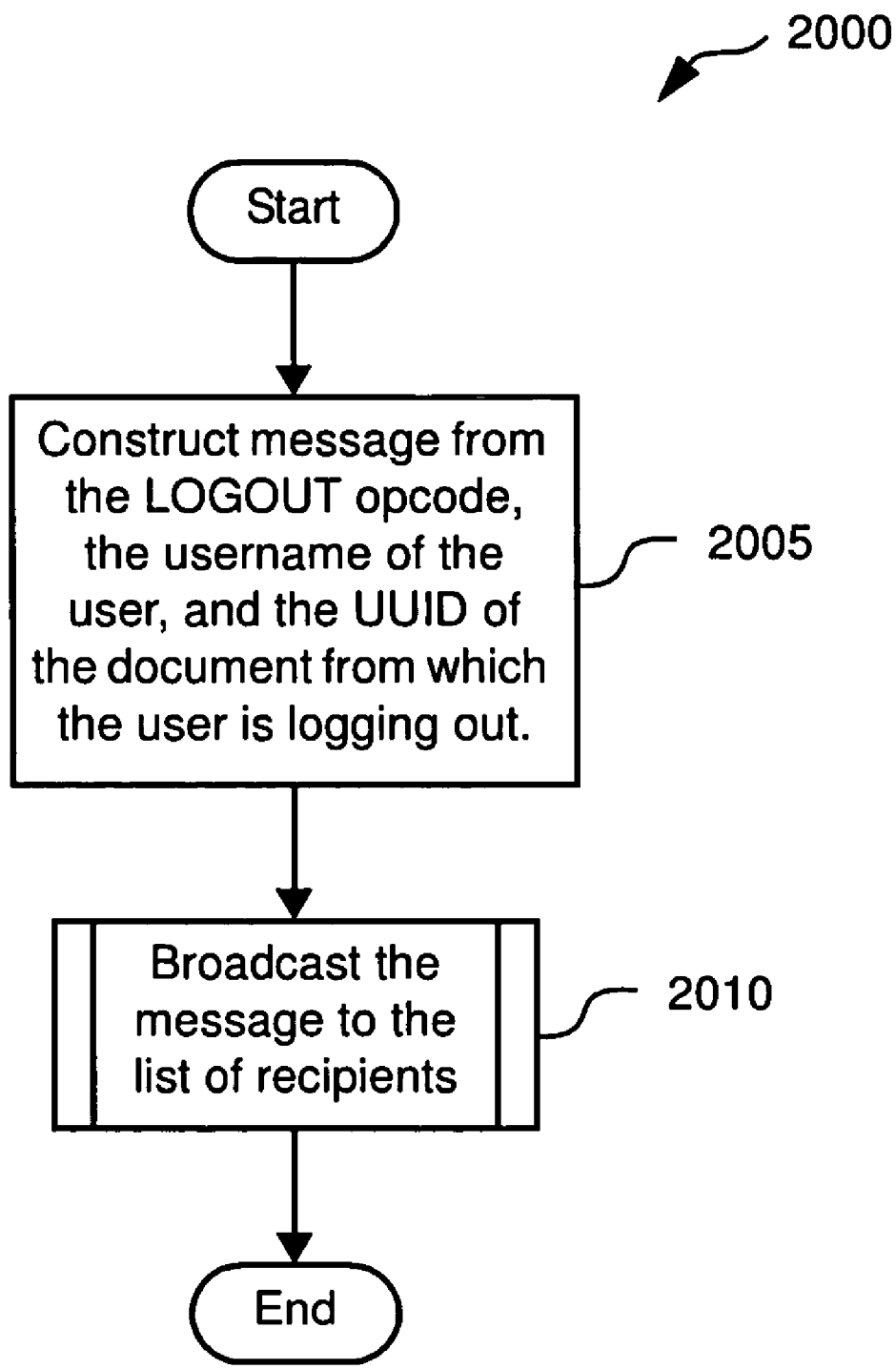
FIG. 20 is a flow diagram showing a method of logging out of an editing session for a document by transmitting a LOGOUT message.

A method 2000 of transmitting a LOGOUT message, as executed at step 116 of the method 100, will now be described with reference FIG. 20. The LOGOUT message indicates that the sender of the message is logging out of an editing session for the document on the network 220. The method 2000 is preferably implemented as software resident on the hard disk drive 210 and being controlled in its execution by the processor 205.

The method 2000 begins at step 2005, where the processor 205 constructs the LOGOUT message from a predetermined LOGOUT opcode. The LOGOUT message includes the username of the collaborator who is logging out of an editing session for the document on the network 220, and the UUID of the document from which the user is logging out. At the next step 2010, the LOGOUT message is transmitted to the collaborators who are currently online, in accordance with the method 1600 shown in FIG. 16.

The methods described above will now be described in further detail by way of example, with reference to FIGS. 17, 18 and 19.

Figure 17:
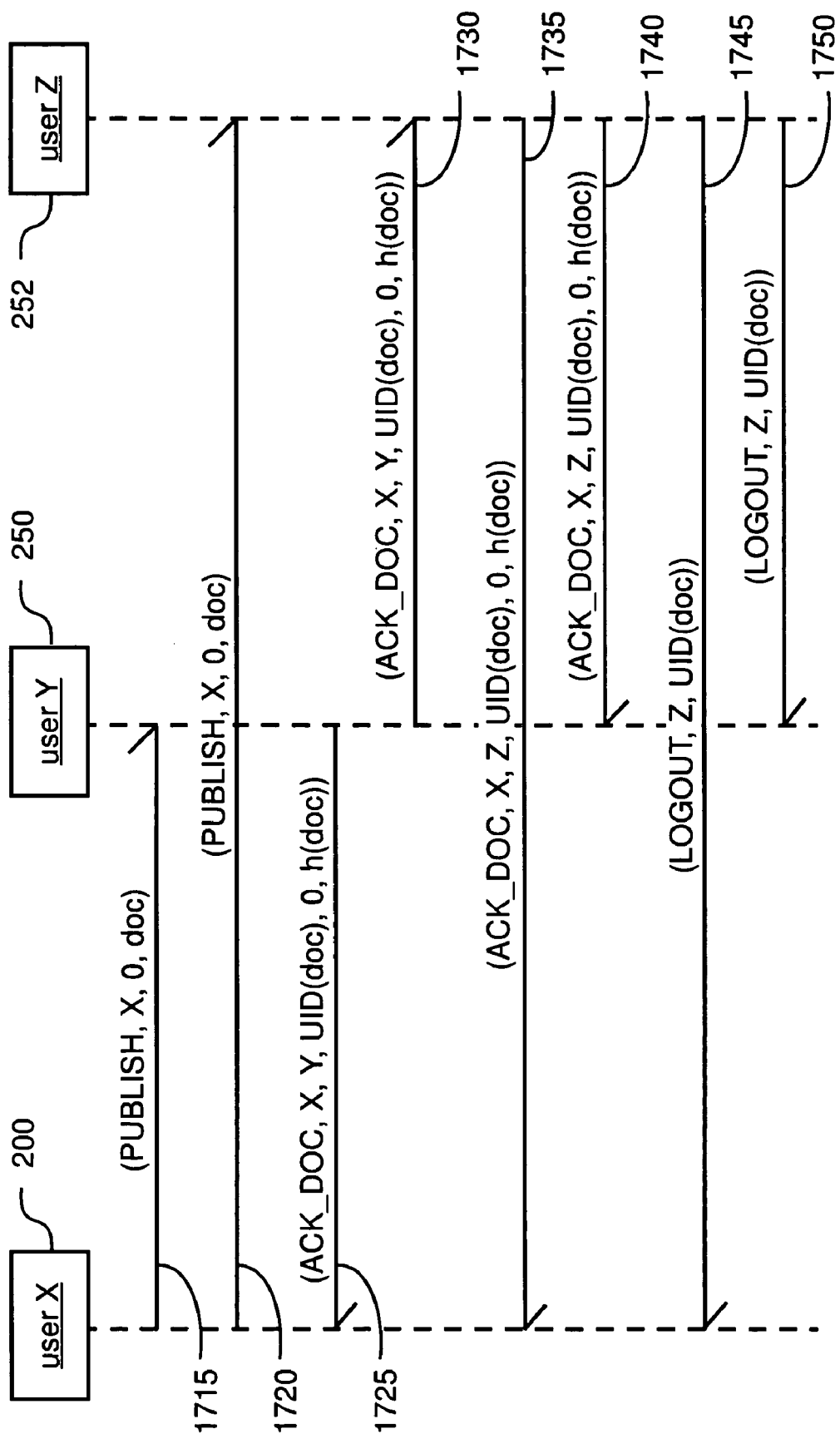
FIG. 17 is a sequence diagram showing the process of publication and acknowledgment of a document, followed by the logout of a collaborator.

FIG. 17 is a sequence diagram showing the process of publication and acknowledgment of a document, followed by the logout of a collaborator. The collaborators are labelled X, Y and Z and are each operating a computer similar to the computer 200 and which are connected to the network 220. In accordance with this example, X is operating the computer 200, Y is operating the computer 250 and Z is operating the computer 252. The arrows referenced as 1715, 1720, 1725, 1730, 1735, and 1740 represent a publishing sequence, where X publishes a document and the collaborators Y and Z acknowledge receipt of the document.

Prior to publishing the document, the computer 200 being operated by X constructs the PUBLISH message from the predetermined PUBLISH message opcode and includes the username (X) of the publisher, a current version string (0), and the document to be published. At the line 1715, the computer 200 transmits the publication message to the computer 250 being operated by Y. Then the computer 200 transmits the publication message to the computer 252 being operated by Z as represented by the arrow 1720.

After receiving the PUBLISH message, the computer 250 being operated by Y constructs the acknowledgment message (i.e., ACK_DOC) from the predetermined ACK_DOC opcode, the username of the author of the document (i.e., X), the username (Y) of the acknowledger, a UUID contained in the received document, the current version string (0), and the result of hashing the document. Then the computer 250 being operated by Y transmits the ACK_DOC message to the computer 200, as represented by the arrow 1725. The computer 250 also transmits the ACK_DOC message to the computer 252 being operated by Z, as referenced by the arrow 1730.

After receiving the ACK_DOC message the computer 252 constructs another acknowledgment message (i.e., ACK_DOC) from the predetermined ACK_DOC opcode, the username of the author of the document (i.e., X), the username (Z) of the acknowledger, the UUID contained in the received document, the current version string (0), and the result of hashing the document. Then the computer 252 transmits the ACK_DOC message to the computer 200, as represented by the arrow 1735. The computer 252 also transmits the ACK_DOC message to the computer 250 being operated by Y, as reference by the arrow 1740.

As each of the collaborators X, Y and Z receive the ACK_DOC messages, the computers 200, 250 and 252 being operated by the X, Y and Z, respectively, update their own copy of the document to note which of the collaborators have acknowledged receipt of the document.

Arrows 1745 and 1750 illustrate a logout scenario. Before broadcasting a LOGOUT message, the computer 252 constructs the LOGOUT message from the predetermined LOGOUT opcode, the username of the collaborator logging out (i.e., Z) of a current editing session, and the UUID of the document. Then the computer 252 being operated by Z transmits the LOGOUT message to the computer 200, as represented by the arrow 1745. The computer 252 also transmits the LOGOUT message to the computer 250 being operated by Y, as reference by the arrow 1745.

Figure 18:
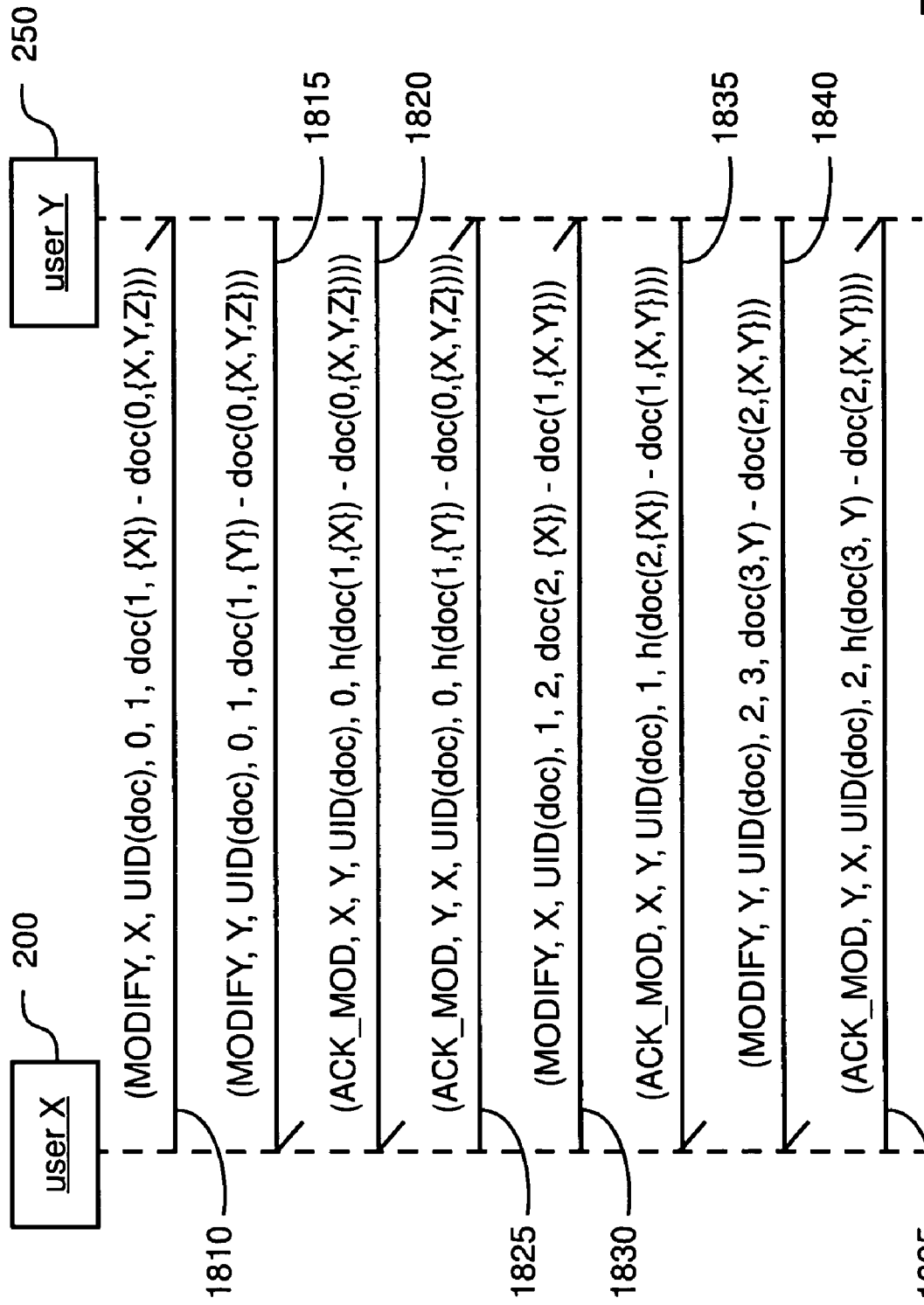
FIG. 18 is a sequence diagram showing the process of performing an online merge of two versions of a document.

FIG. 18 is a sequence diagram showing the process of performing an online merge of two versions of a document with both simultaneous and sequential modifications being made to the document. Again, the collaborator X is operating the computer 200 and the collaborator Y is operating the computer 250. The arrows referenced as 1810, 1815, 1820, and 1825 show a scenario where the collaborators X and Y make simultaneous modifications while online. The computer 200 constructs a MODIFY message from the predetermined MODIFY opcode, the username (X) of the modifier, the UUID of the document, the old version string (0), the new version string (1), and the difference between the two versions of the document. The computer 250 also constructs a MODIFY message from the predetermined MODIFY opcode, from the predetermined MODIFY opcode, the username (Y) of the modifier, the UUID of the document, the old version string (0), the new version string (1), and the patch.

Each copy of the document preferably contains a history of modifications to the document and a record of who made the modifications and, insofar as the document is aware, which collaborators have been made aware of each of the modifications. Accordingly, as described above, associated with each document is version information comprising a version identifier or version string and a list of "known acknowledgers", one of whom is the author. This is represented in FIGS. 17, 18, and 19 by the notation doc (version identifier, known acknowledgers), e.g. doc(0, {X, Y}) to indicate that as far as a particular collaborator is aware, version 0 has been acknowledged by X and Y, but not by Z.

The computer 200 transmits the constructed MODIFY message to the computer 250 as represented by the arrow 1810. The MODIFY message includes the difference between the two versions of the document. Then the computer 250 being operated by Y transmits the MODIFY message which has been constructed by the computer 250 to the computer 200. This MODIFY message includes the patch representing the changes made to the document by Y during the editing session.

The computers 200 and 250 being operated by X and Y must then construct acknowledgment messages for the modifications that they have sent each other. The computer 200 constructs a modification acknowledgment message, ACK_MOD, from the predetermined ACK_MOD opcode. The ACK_MOD message includes the modifier username (i.e., Y), the username of the acknowledger (i.e., X), the UUID of the document, the version string of the version to which the patch applied, and, optionally, a hash of the patch included with the MODIFY message sent by Y (i.e., for verification purposes). The computer 250 constructs a modification acknowledgment message, ACK_MOD, from the predetermined ACK_MOD opcode. Again, the ACK_MOD message includes the username of the modifier (i.e., X), the username of the acknowledger (i.e., Y), the document UUID, the version string of the version to which the patch applied, and, optionally, a hash of the patch representing the modifications to the document made by X (i.e., again for verification purposes). As represented by the arrow 1820, the computer 250 being operated by Y transmits the ACK_MOD message to computer 200. Then, the computer 200 being operated by X transmits the ACK_MOD message to computer 250, as represented by the arrow 1825.

The arrows 1830 and 1835 show the sequence where user X modifies the document, the computer 200 constructs and transmits a MODIFY message, as described above, and the computer 250 being operated by the user Y acknowledges the modification by constructing and transmitting an ACK_MOD message to computer 200. Similarly, the arrows 1840 and 1845 show the sequence where user Y modifies the document, the computer 250 constructs and transmits a MODIFY message, as described above, and the computer 200 being operated by the user X acknowledges the modification by constructing and transmitting an ACK_MOD message to computer 250 which will update the copy of the document to record X's acknowledgement.

Note that throughout FIG. 18 no messages are transmitted to collaborator Z. This is because collaborators X and Y removed collaborator Z from their respective lists of active collaborators in response to the LOGOUT message broadcast by collaborator Z at steps 1745 and 1750.

Figure 19:
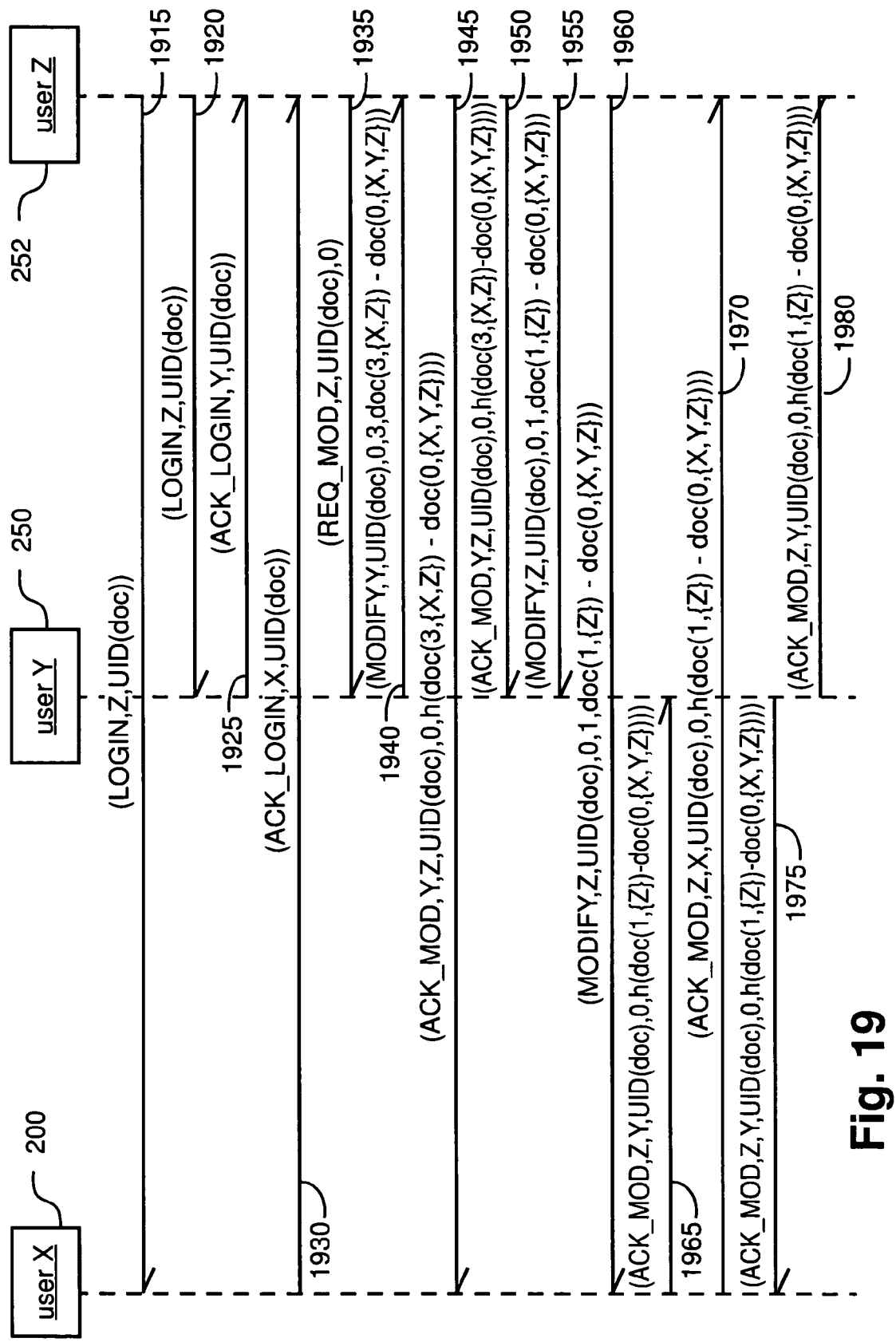
FIG. 19 is a sequence diagram showing the process of performing an online merge of two versions of a document with both simultaneous and sequential modifications.

FIG. 19 is a sequence diagram showing the sequence of events for an online merge of two versions of a document with both simultaneous and sequential modifications. Again, the collaborator X is operating the computer 200 and the collaborator Y is operating the computer 250. Then, the collaborator Z logs into an editing session using the computer 252. The arrows 1915, 1920, 1925, 1930, 1935, 1940, 1945, 1950, 1955, 1960, 1965, 1970, 1975, and 1980 show sequence of event when user Z logs back into the editing session.

Before attempting to log in, the computer 252 must construct a login message, LOGIN, from the predetermined LOGIN opcode, the username (i.e., Z), and the document UUID. The computer 252 then transmits the LOGIN message to the computer 200, as represented by the arrow 1915. The computer 252 also transmits the LOGIN message to the computer 250, as represented by the arrow 1920.

The computers 200 and 250 then acknowledge the LOGIN message transmitted by the computer 252 so that Z can discover which collaborators are online and can provide an update. As illustrated in FIG. 6, the computer 200 constructs an ACK_LOGIN message from the predetermined ACK_LOGIN opcode, the username (X), and the document's UUID, and then transmits the message to the computer 252, as represented by the arrow 1925. Similarly, the computer 250 constructs an ACK_LOGIN message from the predetermined ACK_LOGIN opcode, the username (Y), and the document's UUID, and then transmits the message to the computer 252, as represented by the arrow 1930.

The computer 252 being operated by Z must now update the version of the document stored locally on the computer 252. The computer 252 selects one of the users that have sent back login acknowledgment messages (i.e., ACK_LOGIN). As represented by the arrow 1935, the computer 252 constructs a patch request message (i.e., a require modification message), REQ_MOD, by concatenating the predetermined REQ_MOD opcode, the username (i.e., Z), the UUID of the document, and the version string of the version of the document which needs to be updated. The version string is determined by Z to be the most recent version containing both Y and Z as acknowledgers in the version information (in this case version 0). Alternatively, this argument can be omitted and Y performs this determination. Then the computer 252 transmits the REQ_MOD message to the computer 250 being operated by Y. Upon receiving the REQ_MOD message the computer 250 determines the difference between the latest version and the last version of the document which Z had approved before going offline and constructs a MODIFY message from the predetermined MODIFY opcode. The MODIFY message constructed by the computer 250 includes the username (i.e., Y), the document UUID, and the patch representing the determined difference between the latest version and the last version of the document which Z had approved. The computer 250 then transmits the MODIFY message including the patch to the computer 252, as represented by the arrow 1940.

The computer 252 being operated by Z must then acknowledge receipt of the patch from Y. The computer 252 constructs a modification acknowledgment message, ACK_MOD from the predetermined ACK_MOD opcode. The ACK_MOD message includes the username of the modifier (i.e., Y), the username of the acknowledger (i.e., Z), the document UUID, the old version string, and, optionally, a hash of patch representing the modification made by Y (i.e., for verification purposes). Then the computer 252 transmits the ACK_MOD message to the computer 200, as represented by the arrow 1945. Similarly, the computer 252 transmits the ACK_MOD message to the computer 250, as represented by the arrow 1950.

The user Z must then notify the active collaborators (i.e. X and Y) of any modifications that the user Z has made while offline. The computer 252 constructs a modification message, MODIFY, from the predetermined MODIFY opcode. The MODIFY message includes the username of the modifier (i.e., Z), the document UUID, the old version string (0), the new version string (1), and the difference between the two versions of the document. The computer 252 then transmits the modification message, MODIFY, to Y, as represented by the arrow 1955 and to X as represented by the arrow 1960. In reply to the MODIFY messages sent by Z, the computers 200 and 250 being operated by X and Y, construct and transmit modification acknowledgment messages ACK_MOD to the computer 252 being operated by Z, as represented by the 1970 and 1980. Further, the computer 200 being operated by X constructs and transmits a modification acknowledgment message, ACK_MOD, to Y, in the manner described above, as represented by the arrow 1965. Similarly, the computer 250 being operated by Y constructs and transmits a modification acknowledgment message, ACK_MOD, to X, in the manner described above, as represented by the arrow 1975.

The aforementioned preferred method(s) comprise a particular control flow. There are many other variants of the preferred method(s) which use different control flows without departing from the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive.

The claims defining the invention are as follows:

1. A method of editing an electronic document created by a first one of a plurality of collaborators connected to a network, said method comprising the steps of:
   transmitting a copy of said electronic document over said network to at least each of a second and a third one of said plurality of collaborators;
   receiving from said second and third collaborators, via said network, a first patch from the second collaborator and a second patch from the third collaborator, the first and second patches representing editorial modifications that said second and third collaborators have made to the copies of said electronic document transmitted to said second and third collaborators, wherein the patches are transmitted from said second and third collaborators to said first collaborator separately from each other and from any copy of said electronic document;
   transmitting, from the first to the second collaborator, an acknowledge receipt for said first patch, and from the first to the third collaborator, an acknowledge receipt for said second patch, the copies of the electronic document transmitted to said second and third collaborators being updated upon receipt of the acknowledge receipts;
   merging the editorial modification represented by said first and second patches with any local modifications, using said patches, to produce a merged representation of modifications to be made to said electronic document, wherein said merged representation is dependant on whether one or more of said plurality of collaborators was offline at a time when said editorial modifications of said local modification were made; and
   applying the modifications represented by said merged representation to said electronic document to produce an edited version of said electronic document, the edited version containing data incorporated therein indicating acknowledgment of said modifications made by said second and third collaborators.

2. A method according to claim 1, further comprising the step of updating the data incorporated within the edited version of the document to indicate acknowledgment of said published editorial modifications by the other collaborators.

3. A method according to claim 1, wherein the data identifies the version of the document.

4. A method according to claim 1, wherein the data comprises a universally-unique identifier.

5. A method according to claim 1, wherein the modifications represented by said merged representation are applied depending on whether said second collaborator was active when the document was last modified by any one of the collaborators.

6. A method according to claim 1, further comprising the step of determining a component of the modifications to be made to said document using a calculated weighted arithmetic mean.

7. A method according to claim 1, further comprising the step of electing a value for one or more components of said merged modifications to be made to said document.

8. A method according to claim 1, wherein any one or more of the steps of said method are performed independently by two or more computers connected over said network.

9. A method according to claim 1, wherein the edited version of the document is transmitted over said network.

10. The method according to claim 1, further comprising the steps of:
    the third collaborator receiving, from the second collaborator, the first patch, wherein the first patch is transmitted from the second collaborator to the third collaborator separately from any copy of said electronic document;
    merging the editorial modifications represented by said first patch with the second patch, using said patches, to produce a merged representation of modifications to be made to said copy of the electronic document transmitted to the third collaborator; and
    applying the modifications represented by said merged representation to said copy of the electronic document transmitted to the third collaborator to produce an edited version of said electronic document.

11. A method of synchronizing versions of an electronic document modified collaboratively over a network, said method comprising the steps of:
    determining a most recent version of said electronic document that is stored locally on the network by analyzing data incorporated within one or more locally stored versions of said electronic document, the data indicating acknowledgment of a particular version of said electronic document by at least a first one of a plurality of collaborators;
    requesting a first and second patch representing editorial modifications made to the most recent version of said electronic document by a second and third one of the collaborators at a remote location of the network;
    receiving from said second and third collaborators, via said network, said first patch from the second collaborator and said second patch from the third collaborator, the first and second patches representing said editorial modifications that said second and third collaborators have made to said most recent version of said electronic document, wherein the patches are transmitted from said second and third collaborators to said first collaborator separately from each other and from any copy of said electronic document;
    transmitting, from the first to the second collaborator, an acknowledge receipt for said first patch, and from the first to the third collaborator, an acknowledge receipt for said second patch, copies of the electronic document stored with said second and third collaborator being updated upon receipt of the acknowledge receipts; and
    applying the modifications represented by said received patches to the locally stored most recent version of said electronic document to produce a synchronized version of said electronic document.

12. A method according to claim 11, further comprising the step of merging the editorial modifications represented by said received first and second patches with any local modifications using said received patches to produce a merged representation of modifications to be made to said electronic document.

13. A method according to claim 12, further comprising the step of applying the modifications represented by said merged representation to said electronic document to produce an edited version of said electronic document.

14. A method according to claim 13, further comprising the step of updating data incorporated within the edited version of said electronic document to indicate acknowledgment of receipt of said received patches made by said second and third collaborators.

15. A method according to claim 11, wherein the data identifies the version of a particular electronic document.

16. A method according to claim 11, wherein the data comprises a universally-unique identifier.

17. An apparatus for editing an electronic document created by a first one of a plurality of collaborators connected to a network, said apparatus comprising:
   a memory for storing data; and
   a processor for use in transmitting a copy of said electronic document over said network to at least a second and a third one of said plurality of collaborators, receiving from said second and third collaborators, via said network, a first patch from the second collaborator and a second patch from the third collaborator, the first and second patches representing editorial modifications that said second and third collaborators have made to the copies of said electronic document transmitted to said second and third collaborators, wherein the patches are transmitted from said second and third collaborators separately from each other and from any copy of said electronic document, said processor being further configured for transmitting, from the first to the second collaborator, an acknowledge receipt for said first patch, and from the first to the third collaborator, an acknowledge receipt for said second patch, copies of the electronic document transmitted to said second and third collaborators being updated upon receipt of the acknowledge receipts, said processor being still further configured for merging the editorial modifications represented by said first and second patches with any local modifications, using said patches, to produce a merged representation of modifications to be made to said electronic document, and for applying the modifications represented by said merged representation to said electronic document to produce an edited version of said electronic document.

18. An apparatus for synchronizing versions of electronic document modified collaboratively over a network, said apparatus comprising:
   a memory for storing data;
   a processor for use in determining a most recent version of said electronic document that is stored locally on the network by analyzing data incorporated within one or more locally stored versions of said electronic document, the data indicating acknowledgment of a particular version of said electronic document by at least a first one of a plurality of collaborators, requesting a first and second patch representing editorial modifications made to said most recent version of said electronic document by a second and third one of said collaborators at a remote location of said network, and for receiving from said second and third collaborators, via said network, said first patch from the second collaborator and said second patch from the third collaborator, the first and second patches representing said editorial modifications that said second and third collaborators have made to said most recent version of said electronic document, wherein the patches are transmitted from said second and third collaborators to said first collaborator separately from each other and from any copy of said electronic document, said processor being further configured to transmitting, from the first to the second collaborator, an acknowledge receipt for said first patch, and from the first to the third collaborator, an acknowledge receipt for said second patch, wherein the second and third collaborators update copies of the electronic document stored with said second and third collaborator upon receipt of the acknowledge receipts, and said processor being still further configured for applying the modifications represented by said received patches to said most recent version of said electronic document, to produce a synchronized version of said electronic document.

19. A computer readable medium, having a program recorded thereon, wherein the program is configured to make a computer execute a procedure to edit an electronic document created by a first one of a plurality of collaborators connected to a network, said program comprising:
   code for transmitting a copy of said electronic document over said network to at least each of a second and a third one of said plurality of collaborators;
   code for receiving from said second and third collaborators, via said network, a first patch from the second collaborator and a second patch from the third collaborator, the first and second patches representing editorial modifications that said second and third collaborators have made to the copies of said electronic document transmitted to said second and third collaborators, wherein the patches are transmitted from said second and third collaborators to said first collaborator separately from each other and from any copy of said electronic document;
   code for transmitting, from the first to the second collaborator, an acknowledge receipt for said first patch, and from the first to the third collaborator, an acknowledge receipt for said second patch, the conies of the electronic document transmitted to said second and third collaborators being updated upon receipt of the acknowledge receipts;
   code for merging said editorial modifications represented by said first and second patches with any local modifications, using said patches, to produce a merged representation of modifications to be made to said electronic document, and wherein said merged representation is dependent on whether one or more of said plurality of collaborators was offline at a time when said editorial modifications of said local modification were made; and
   code for applying the modifications represented by said merged representation to said electronic document to produce an edited version of said electronic document.

20. A computer readable medium, having a program recorded thereon, wherein the program is configured to make a computer execute a procedure to synchronize versions of an electronic document modified collaboratively over a network, said program comprising:
   code for determining a most recent version of said electronic document that is stored locally on the network by analyzing data incorporated within one or more locally stored versions of said electronic document, said data indicating acknowledgment of a particular version of said electronic document by at least a first one of a plurality of collaborators;
   code for requesting a first and second patch representing editorial modifications made to said most recent version of said electronic document by a second and a third one of said collaborators at a remote location of the network;

code for receiving from said second and third collaborators, via said network, said first patch from the second collaborator and said second patch from the third collaborator, the first and second patches representing said representing said editorial modifications that said second and third collaborators have made to said most recent version of said electronic document, wherein the patches are transmitted from said second and third collaborators to said first collaborator separately from each other and from any copy of said electronic document;

transmitting, from the first to the second collaborator, an acknowledge receipt for said first patch, and from the first to the third collaborator, an acknowledge receipt for said second patch, copies of the electronic document stored with said second and third collaborator being updated upon receipt of the acknowledge receipts; and code for applying the modification represented by said received patches to the locally stored said most recent version of said electronic document to produce a synchronized version of said electronic document.

21. A computer program product including a computer readable medium having recorded thereon a computer program for editing an electronic document created by a first one of a plurality of collaborators connected to a network, said program comprising:

code for transmitting a copy of said electronic document over said network to at least each of a second and a third one of said plurality of collaborators;

code for receiving from said second and third collaborators, via said network, a first patch from the second collaborator and a second from the third collaborator, the first and second patches representing editorial modifications that said second and third collaborators have made to the copies of said electronic document transmitted to said second and third collaborators, wherein the patches are transmitted from said second and third collaborators to said first collaborator separately from each other and from any copy of said electronic document;

code for transmitting, from the first to the second collaborator, an acknowledge receipt for said first patch, and from the first to the third collaborator, an acknowledge receipt for said second patch, copies of the electronic document stored with said second and third collaborator being updated upon receipt of the acknowledge receipts;

code for merging said editorial modifications represented by said first and second patches, with any local modifications, using said patches, to produce a merged representation of modifications to be made to said electronic document; and code for applying the modifications represented by said merged representation to said electronic document to produce an edited version of said electronic document.

22. A computer program product including a computer readable medium having recorded thereon a computer program for synchronizing versions of an electronic document modified collaboratively over a network, said program comprising:

code for determining a most recent version of said document that is stored locally on said network by analyzing data incorporated within one or more locally stored versions of said electronic document, said data indicating acknowledgment of a particular version of said electronic document by at least a first one of a plurality of collaborators;

code for requesting a first and second patch representing editorial modifications made to the most recent version of said electronic document by a second and third one of said collaborators at a remote location of said network code for receiving from said second and third collaborators, via said network, said first patch from the second collaborator and said second patch from the third collaborator, the first and second patches representing said editorial modifications that said second and third collaborators have made to said most recent version of said electronic document, wherein the patches are transmitted from said second and third collaborators to said first collaborator separately to each other as well as to any copy of said electronic document; and code for transmitting, from the first to the third collaborator, an acknowledge receipt for said first patch, and from the first to the third collaborator, an acknowledge receipt for said second patch, copies of the electronic document stored with said second and third collaborator being updated upon receipt of the acknowledge receipts;

code for applying the modifications represented by said received patches to the locally stored most recent version of said electronic document to produce a synchronized version of said electronic document.

* * * * *